(12) United States Patent
Marshall

(10) Patent No.: US 9,432,272 B2
(45) Date of Patent: *Aug. 30, 2016

(54) AUTOMATED NETWORK CONDITION IDENTIFICATION

(71) Applicant: COMCAST CABLE COMMUNICATIONS, LLC, Philadelphia, PA (US)

(72) Inventor: Ian D. Marshall, Rosedale, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,290

(22) Filed: Jan. 24, 2014

(65) Prior Publication Data
US 2014/0140236 A1 May 22, 2014

Related U.S. Application Data

(63) Continuation of application No. 13/239,782, filed on Sep. 22, 2011, now Pat. No. 8,675,500, which is a continuation of application No. 12/415,670, filed on Mar. 31, 2009, now Pat. No. 8,064,364.

(51) Int. Cl.
*H04L 12/26* (2006.01)
*H04L 12/28* (2006.01)
*H04L 12/24* (2006.01)

(52) U.S. Cl.
CPC ......... *H04L 43/065* (2013.01); *H04L 12/2801* (2013.01); *H04L 12/2858* (2013.01); *H04L 41/12* (2013.01); *H04L 41/507* (2013.01); *H04L 41/5035* (2013.01); *H04L 41/5074* (2013.01); *H04L 43/0817* (2013.01); *H04L 43/0847* (2013.01)

(58) Field of Classification Search
USPC .......... 370/242–254, 262–310; 709/204–224
See application file for complete search history.

(56) References Cited

U.S. PATENT DOCUMENTS

| | | | |
|---|---|---|---|
| 6,343,290 B1 * | 1/2002 | Cossins et al. | |
| 7,050,946 B2 * | 5/2006 | Delegue et al. | 702/188 |
| 7,286,965 B2 * | 10/2007 | Marilly et al. | 702/183 |
| 7,535,849 B2 * | 5/2009 | Laiho et al. | 370/241.1 |

(Continued)

FOREIGN PATENT DOCUMENTS

EP 1901182 A1 3/2008

OTHER PUBLICATIONS

European Search Report for EP10157635.3-2416 dated Jul. 7, 2010.

(Continued)

*Primary Examiner* — Man Phan
(74) *Attorney, Agent, or Firm* — Banner & Witcoff, Ltd.

(57) ABSTRACT

Performance data relating to each of multiple network devices distributed in a geographic region is analyzed. That data can include values for various parameters measured automatically by routine polling of subscriber devices and/or network elements serving those subscriber devices. Measured parameter values can then be stored in a database and made available, together with information about subscriber device locations, to one or more analysis servers that analyze different portions of the network. As part of that analysis, groups of devices experiencing performance problems are identified based on device location. Information about those groups is then communicated and can be made available for, e.g., monitoring by service personnel.

18 Claims, 22 Drawing Sheets

(56) References Cited

U.S. PATENT DOCUMENTS

| | | | |
|---|---|---|---|
| 7,787,384 B2* | 8/2010 | Rible | 370/241 |
| 8,423,633 B2* | 4/2013 | Xia et al. | 709/224 |
| 2003/0120764 A1* | 6/2003 | Laye et al. | 709/223 |
| 2004/0024859 A1* | 2/2004 | Bloch et al. | 709/223 |
| 2004/0098457 A1* | 5/2004 | Betge-Brezetz et al. | 709/204 |
| 2005/0125239 A1* | 6/2005 | Martinot et al. | 705/1 |
| 2005/0238017 A1 | 10/2005 | Delegue et al. | |
| 2007/0185990 A1 | 8/2007 | Ono et al. | |
| 2008/0070527 A1 | 3/2008 | Betge-Brezetz et al. | |
| 2008/0192642 A1 | 8/2008 | Squedin et al. | |
| 2008/0288820 A1 | 11/2008 | Archer et al. | |

OTHER PUBLICATIONS

European Office Action—EP Appl. 10157635.3—dated Jul. 13, 2015.
Response to European Office Action—EP Appl. 10157635.3—submitted Nov. 25, 2015.
Canadian Office Action—CA Appl. 2,697,701—dated May 26, 2016.

* cited by examiner

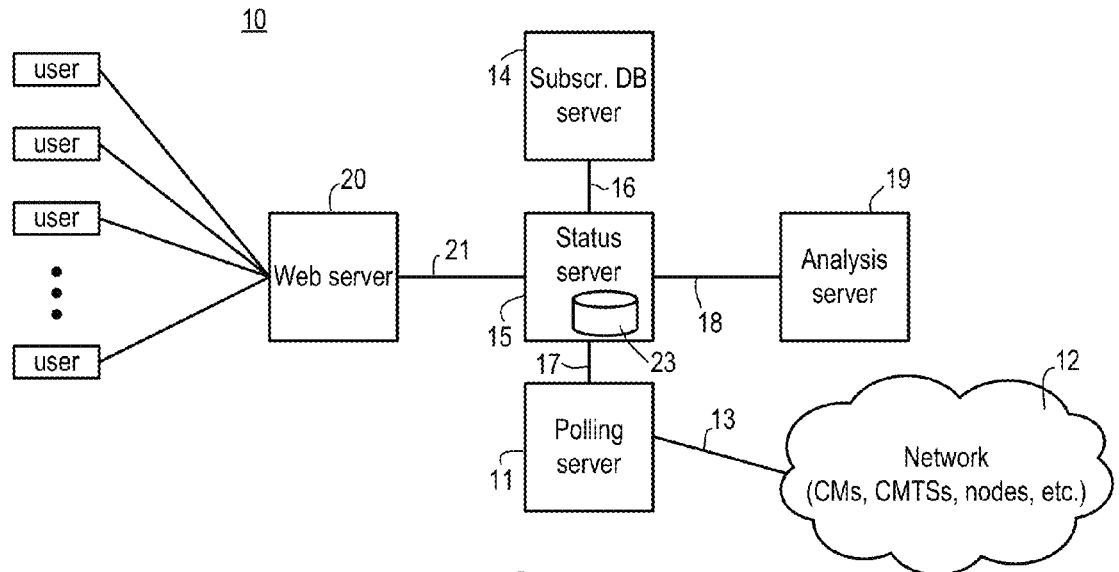

FIG. 2C

| SDev_stat | | | |
|---|---|---|---|
| SDev_ID | DnSNR | UpTx | DnRx |
| | | | |
| | | | |
| ⋮ | ⋮ | ⋮ | ⋮ |

| CMTS_stat | | | | | | |
|---|---|---|---|---|---|---|
| CMTS_ID | CMTS_IPaddr | Div | Node_ID | SDev_ID | DnTx | UpSNR |
| | | | | | | |
| | | | | | | |
| ⋮ | ⋮ | ⋮ | ⋮ | ⋮ | ⋮ | ⋮ |

| RegState | | |
|---|---|---|
| SDev_ID | IPaddr | Reg |
| | | |
| | | |
| ⋮ | ⋮ | ⋮ |

35

| i | SDev_ID | Addr | Long | Lat | Bldg | DnSNR | DnSNR_Gr | UpSNR | UpSNR_Gr | UpTx | UpTx_Gr | DnRx | DnRx_Gr | Reg | Reg_Gr |
|---|---------|------|------|-----|------|-------|----------|-------|----------|------|---------|------|---------|-----|--------|
| 0 | | | | | | | | | | | | | | | |
| 1 | | | | | | | | | | | | | | | |
| 2 | | | | | | | | | | | | | | | |
| 3 | | | | | | | | | | | | | | | |
| ... | ... | ... | ... | ... | ... | ... | ... | ... | ... | ... | ... | ... | ... | ... | ... |
| n | | | | | | | | | | | | | | | |

SDev_analysis

AUTOMATED NETWORK CONDITION IDENTIFICATION

CROSS-REFERENCE TO RELATED APPLICATIONS

This application is a continuation of U.S. patent application Ser. No. 13/239,782, entitled "Automated Network Condition Identification," filed Sep. 22, 2011, and issued as U.S. Pat. No. 8,675,500, which is a continuation of U.S. patent application Ser. No. 12/415,670, entitled "Automated Network Condition Identification," filed Mar. 31, 2009, and issued as U.S. Pat. No. 8,064,364, the disclosures of each of which are incorporated by reference herein in their entirety.

BACKGROUND

Monitoring and maintaining the performance of a data network becomes increasingly complex and labor-intensive as the size of that network grows. For example, various telecommunication system operators provide High-Speed Internet (HSI) service to subscribing customers at their home and/or business using networks that span multiple states or other large geographic regions. Because of the size of such networks, many problems that occur are often the result of a condition at a customer location or in network facility (e.g., a hub, node or external distribution line) where service personnel are not present. When such problems occur, it is thus necessary to dispatch service personnel to the location of a reported problem.

A traditional approach to identification and correction of plant-related network issues has been to dispatch service personnel in response to each customer complaint. After arriving on site and investigating the customer complaint, a technician determines if there is a plant-related problem and then corrects that problem. There are several disadvantages to this approach. For example, a plant-related problem may not be noticed until a customer reports a problem. It may then be several hours or days before a technician is available, thus causing customer dissatisfaction. Moreover, many customer complaints are simply reports of no service or of other type service degradation. Such reports may convey little information about the source or extent of a problem.

SUMMARY

This Summary is provided to introduce a selection of concepts in a simplified form that are further described below in the Detailed Description. This Summary is not intended to identify key features or essential features of the invention.

In at least some embodiments, performance data relating to each of multiple network devices distributed in a geographic region is analyzed. That data can include values for various parameters measured automatically by routine polling of subscriber devices and/or of network elements serving those subscriber devices. Measured parameter values can then be stored in a database and made available, together with information about subscriber device locations, to one or more analysis servers. An analysis server continuously and simultaneously analyzes different portions of the network. As part of that analysis, groups of devices experiencing performance problems are identified based on device location. Information about those groups is then communicated and can be made available for, e.g., monitoring by service personnel.

BRIEF DESCRIPTION OF THE DRAWINGS

Some embodiments of the present invention are illustrated by way of example, and not by way of limitation, in the figures of the accompanying drawings and in which like reference numerals refer to similar elements.

FIG. 1 is a block diagram of an automated system, according to at least some embodiments, for identifying conditions and patterns of conditions in a communication network.

FIGS. 2A through 2E are examples of tables stored by a status server in the system of FIG. 1.

FIG. 4 shows a table generated during performance of the algorithm of FIGS. 3A through 3E.

DETAILED DESCRIPTION

Figure 3A:
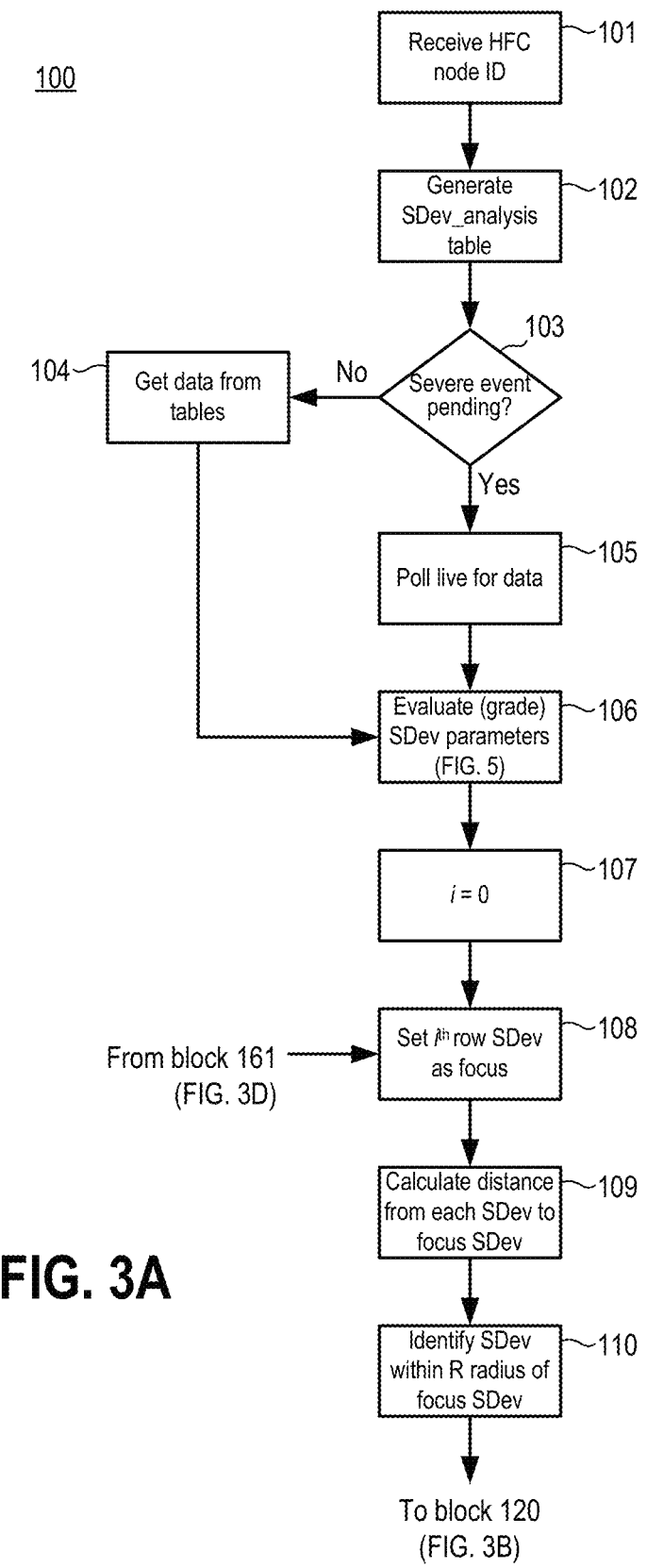
FIGS. 3A through 3E are a flow chart showing an analysis algorithm performed by the analysis server of FIG. 1 according to at least some embodiments.
Figure 3B:
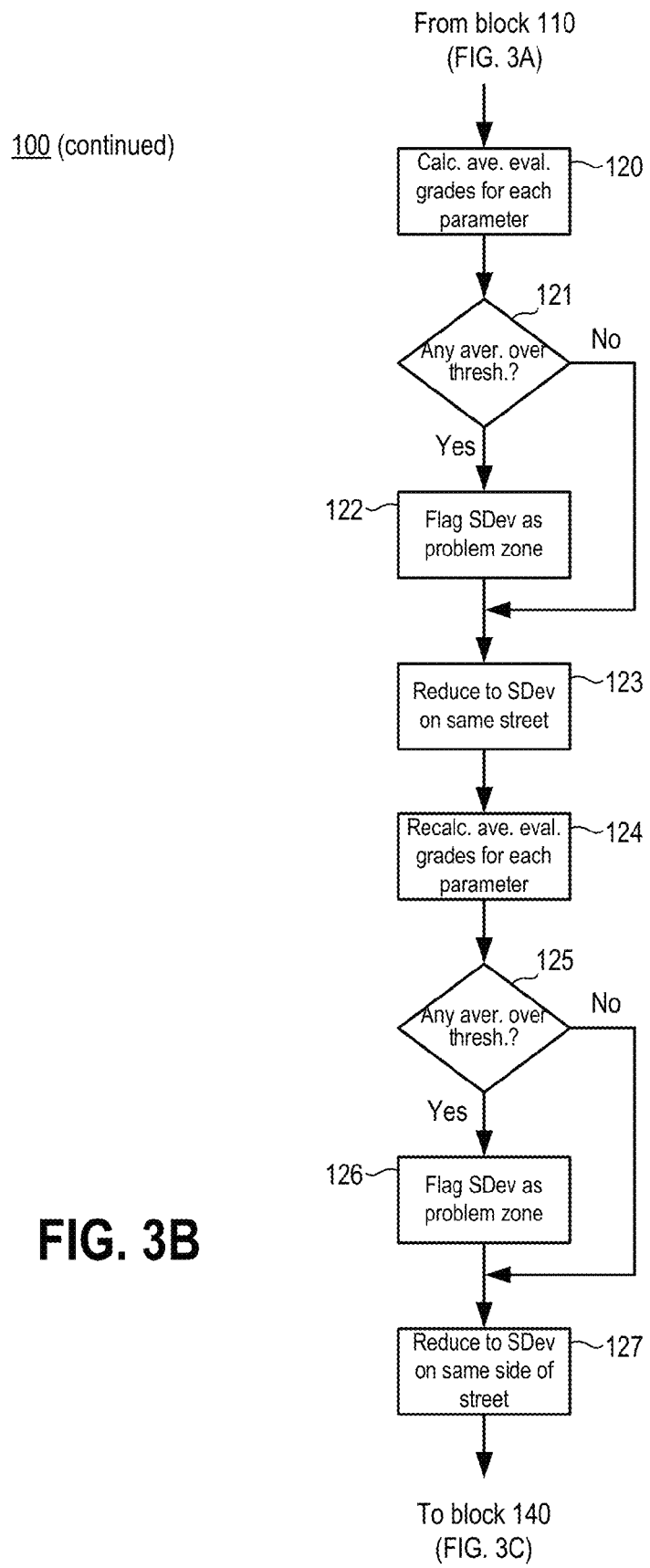
Figure 3C:
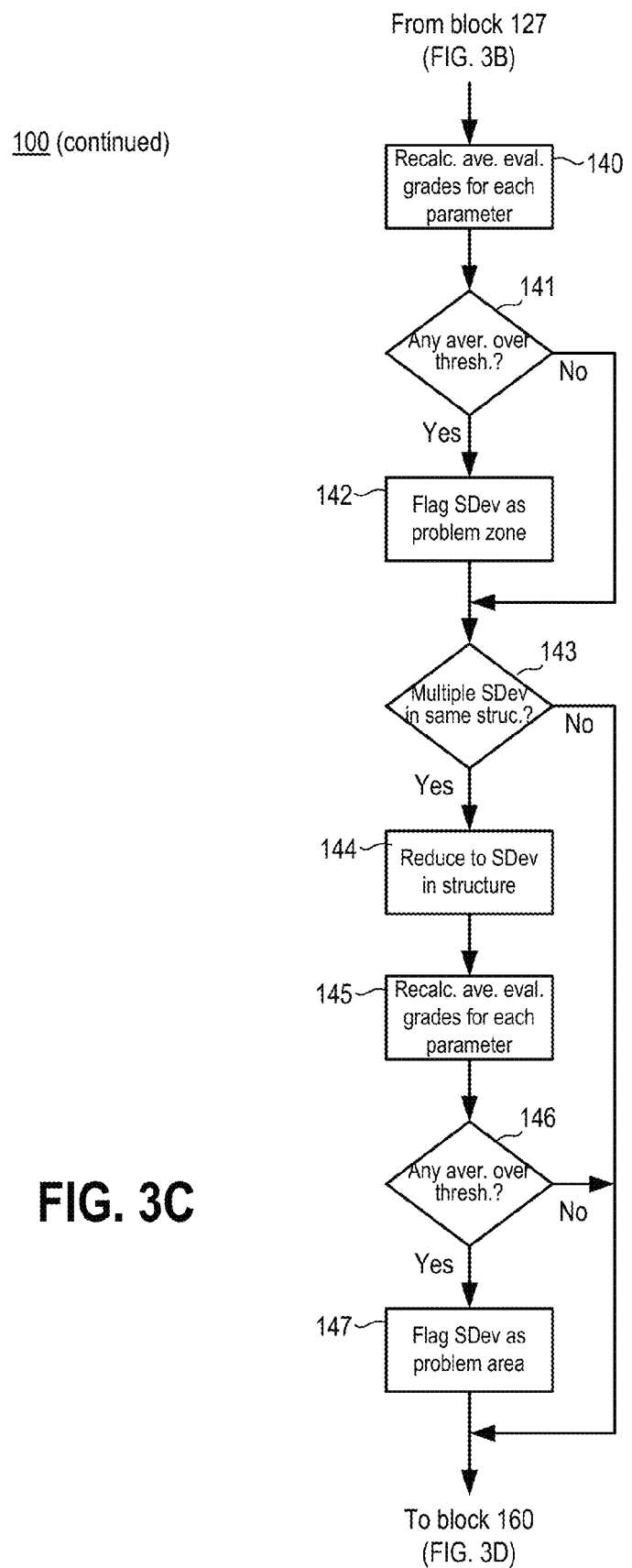

Some embodiments are described in the context of a High-Speed Internet (HSI) data service provided to subscribers over an access network utilizing communication protocols described in one or more Data-Over-Cable Service Interface Specifications (DOCSIS) standards. Said standards are known in the art and available from Cable Television Laboratories, Inc. (CableLabs®) of Louisville, Colo. However, the invention is not limited to networks using a specific type of communication protocol or a specific physical communication medium.

FIG. 1 is a block diagram of an automated system 10, according to at least some embodiments, for identifying conditions and patterns of conditions in a communication network. System 10 includes a network polling server 11. Polling server 11 communicates with various types of devices in a data communication network 12 over one or more network links 13. In some embodiment of FIGS. 1-12, system 10 is configured to communicate with multiple portions of a nationwide high speed data network 12 that serves individual subscribers over a hybrid fiber coaxial (HFC) plant and that operates in accordance with one or more DOCSIS protocols. Such networks are used by various system operators to provide high speed internet (HSI) and other multimedia services (e.g., cable television, Voice over IP (VoIP) telephone service) to subscribing customers. Typically, each subscriber location has one or more of a cable modem (CM), media terminal adapter (MTA), or other type of subscriber device that is served by a Cable Modem Termination System (CMTS) situated in a hub or other central location. The CMTS forwards upstream communications from a subscriber device to other points in the network and/or to other networks, forwards data from other network locations or other networks downstream to the subscriber device, and controls access of the subscriber device to the network.

Polling server 11 automatically and periodically polls each CM or other subscriber device in network 12, as well as each CMTS in network 12, to obtain performance data. In some embodiments, polling server 11 periodically obtains measured values for the following parameters from each subscriber device: received downstream signal level (DnRx) in decibel millivolts (dBmV), downstream signal to noise ratio (DnSNR) in decibels (dB), and transmitted upstream signal level (UpTx) in dBmV. From each CMTS, polling server 11 periodically obtains values for measurements of received upstream signal level (UpRx) in dBmV from each subscriber device served by the CMTS, transmitted downstream signal level (DnTx) in dBmV, and upstream signal to noise ratio (UpSNR) in dB from each subscriber device served by the CMTS. Polling server 11 also obtains the registration state (RegStat) of each subscriber device, either from CMTSs or from other elements (e.g., provisioning servers) in network 12. As to each subscriber device, the RegStat value is either "connected" or "not connected."

Also included in system 10 is a subscriber database server 14. Server 14 maintains account information for subscribers. That account information includes the street address of each subscriber, and may contain other types of location information such as longitude and latitude coordinates. Account information for a subscriber may also include whether a subscriber location is in an apartment building, office building or other building that includes multiple separate subscribers. In some embodiments, account information also includes a Media Access Control (MAC) address or other identifier for each authorized subscriber device. Subscriber database server 14 also includes records of outages and other trouble reports associated with subscribers. For example, a subscriber may call the system operator and report that his or her HSI service is slow or is offline.

Data from polling server 11 and subscriber database server 14 are periodically retrieved by network status server 15 over links 16 and 17. Network status server 15 combines that retrieved data into one or more tables in a database 23 to facilitate analysis of network conditions. Examples of those tables and the data therein are described below. Information from tables in status server 15 is retrieved over link 18 and analyzed by analysis server 19. Results of such analyses are then stored on status server 15 in database 23. Individual users of system 10, which may include service personnel, network engineers, etc., access information in database 23 using a web browser application on a laptop or other client device. The users' client devices retrieve information from database 23 through a web server 20. Web server 20 communicates with status server 15 over a link 21. Further details of the manner in which network status information is presented to users and of the operation of web server 20 are provided below.

As also discussed below, each of servers 11, 14, 15, 19 and 20 is a computing platform having processors and memories storing instructions for operation as described herein. Each of servers 11, 14, 15, 19 and 20 further includes network interface hardware to facilitate communication with each other and with other network elements. Although illustrated as separate devices, the operations and functions of those devices could be combined into fewer, or distributed across more, computing platforms.

FIGS. 2A-2E are examples of tables stored in database 23 of status server 15. Server 15 may store numerous instances of the tables such as are shown in FIGS. 2A-2E. Moreover, the tables of FIGS. 2A-2E are merely examples of how data can be arranged for analysis in accordance with some embodiments. The actual format of data and/or of the tables or other data structures used to organize that data will vary among different embodiments. In some embodiments, for example, data from polling server 11 and subscriber database server 14 (and/or from other databases) could be imported into a single table. In other embodiments, different numbers and/or combinations of tables can be used. So as to avoid unnecessary detail in the drawings, various fields of the tables in FIGS. 2A-2E and in later figures are left blank where the type of data placed in one of those fields is described herein.

FIG. 2A shows an example of a subscriber information ("Subscrib_info") table 31 maintained in database 23 according to some embodiments. Each field in the first column of table 31 holds a value for a unique subscriber identifier ("Subscr_ID") such as an account number. Each field in the next column ("Addr") contains a subscriber physical street address, with each field of the next two columns ("Long" and "Lat") containing values for the longitude and latitude, respectively, of a subscriber location. Each field in the "Bldg" column holds a value that indicates whether a subscriber is in a single family home or other building containing no other subscribers. Each field of the "Div" column holds a value indicating the network operating division of which a subscriber is a part. For example, an operator of a national network may divide that network into regions based on states, cities, etc. The remaining columns ("SDev1," "SDev2," . . . "SDevN") have fields to hold MAC addresses or other identifiers for authorized subscriber devices. If a particular subscriber has less than "N" authorized devices, the MAC addresses can be placed into fields starting with column SDev1, with a <NULL> value inserted into each column for which there is no subscriber device.

FIG. 2B shows an example of a trouble call ("Trouble_calls") table 32 maintained in database 23 according to some embodiments. Each field of the first column ("Call_ID") contains a unique identifier assigned to a report of a problem with service to a particular subscriber. Each field in the next column ("Time") holds a value for the time and date of the trouble call (e.g., the time and date the subscriber called to report a problem). The SDev1 through SDevN columns have fields to hold MAC addresses or other identifiers for subscriber devices that are associated with the subscriber to which a trouble call relates. In many cases, only fields of the SDev1 columns will contain a device identifier, with fields of the remaining SDev columns containing a <NULL>. In some embodiments, table 32 may also contain one or more columns ("Descr") having fields to hold information about a trouble call (e.g., total outage, slow service, etc.). Table 32 may also have columns Div and Node having fields for division and node identifiers corresponding to a trouble call.

FIG. 2C shows an example of a subscriber device status ("SDev_stat") table 33 maintained in database 23 according to some embodiments. Each field of the first column ("SDev_ID") holds a value for a MAC address or other subscriber device identifier. There may thus be multiple rows in table 33 associated with a subscriber having multiple authorized devices (e.g., a cable modem and a separate MTA). Each field in the "UpTx" column holds a dBmV value for an upstream transmitted signal level reported by a subscriber device. Each field of the "DnSNR" column holds a dB value for a signal to noise ratio reported by a subscriber device for a downstream signal received at the subscriber device. Each field in the "DnRx" column holds a dBmV value for the signal level of a downstream signal received by a subscriber device.

FIG. 2D shows an example of a CMTS status ("CMTS_stat") table 34 maintained in database 23 according to some embodiments. Each field in the first column ("CMTS_ID") contains an unique identifier for a CMTS. Each field in the second column ("CMTS_IPaddr") contains an Internet Protocol ("IP") address assigned to a CMTS. Each field of the third column ("Div") holds a value indicating the network operating division in which a CMTS is located. Each field of the "Node_ID" column holds a value for a unique identifier assigned to an HFC optical node. As known in the art, such nodes convert fiber-optically transmitted downstream signals into electrical signals for communication over coaxial cable, and convert upstream electrical signals received over those same coaxial cables into optical signals for upstream transmission. Each field in the next column of table 34 ("SDev_ID") holds a value for a MAC address or other subscriber device identifier.

In at least some embodiments, a single CMTS may serve multiple HFC optical nodes. Each HFC optical node will serve many subscribers, and some subscribers may have more than one subscriber device. Accordingly, numerous rows of table 34 will correspond to a single CMTS. All of those rows corresponding to a single CMTS will have the same value in the CMTS_ID field and will also have the same IP address (and thus the same value in the "CMTS_IPaddr" field). Different subsets of those rows will correspond to the HFC optical nodes served by that CMTS and have the same value in the Node_ID field. Within each subset of rows corresponding to a single HFC optical node may be numerous rows that correspond to individual subscriber devices, with each of those numerous rows having a different MAC address or other device identifier in the SDev_ID field. If a subscriber has multiple subscriber devices, multiple rows in table 34 will correspond to that subscriber.

Returning to FIG. 2D, each field in the DnTx column of table 34 holds a dBmV value reported by a CMTS for transmitted signal level on a downstream channel applicable to a specific subscriber device having its MAC address (or other identifier) on the same row. Each field in the UpSNR column holds a dB value reported by a CMTS for a signal to noise ratio at the CMTS for an upstream signal received from a subscriber device.

FIG. 2E shows an example of a registration state ("RegState") table 35 maintained in database 23 according to some embodiments. Each field of the first column ("SDev_ID") holds a value for a MAC address or other subscriber device identifier, and there will thus be multiple rows in table 35 associated with a subscriber having multiple authorized devices. Each field of the "SDev_IPaddr" column holds a value for an IP address assigned to a subscriber device. Each field of the "Reg" column holds a value indicating whether or not a subscriber device is currently registered in the network. For example, a subscriber device that loses power or is otherwise unable to respond to periodic polls may have its registration entry in a CMTS or other network element deleted. The subscriber device may be re-registered after rebooting or otherwise coming back online.

FIGS. 3A through 3E are a flow chart for an algorithm 100 performed by analysis server 19 according to at least some embodiments. The algorithm of FIGS. 3A-3E is carried out by one or more processors of analysis server 19 according to instructions stored in a memory of that analysis server as executable code and/or according to hardwired logic instructions within the processor(s) of that analysis server. As explained in more detail below, multiple instances of algorithm 100 are simultaneously performed by analysis server 19 with regard to different portions of network 12.

Beginning at block 101 of FIG. 3A, analysis server 19 chooses (or is provided with) an identifier for a single HFC optical node in network 12. In at least some embodiments, analysis server 19 executes an instance of algorithm 100 to evaluate operation of a portion of network 12 associated with a particular geographic region. In some such embodiments, an instance of algorithm 100 evaluates operation of the network portion that includes subscriber devices served by a single HFC node, and the associated geographic region is the region in which those subscriber devices are located.

As part of its analysis when executing algorithm 100, server 19 evaluates values for various operating parameters reported by (or otherwise corresponding to) each subscriber device. Analysis server 19 then provides an output representing the condition of the portion of network 12 associated with the geographic region served by the HFC optical node. In other embodiments, a different portion of network 12 can be selected for analysis in an algorithm similar to that of FIGS. 3A-3E (e.g., a subset of all subscriber devices served by a node, all devices served by multiple nodes, all devices served by a CMTS, etc.).

Analysis server 19 begins in block 101 with a node identifier that can be used as an index to CMTS_stat table 34 (FIG. 2D) maintained in database 23. In other embodiments, analysis server 19 is given some other identifier of a node, which the analysis server then uses to obtain a network division and/or node identifier that can be used as indexes in the Div and Node_ID columns of CMTS_stat table 34. In still other embodiments, separate CMTS_stat tables may be maintained for individual CMTSs or for CMTSs in a particular network division or portion of a division. For convenience, the HFC optical node chosen by or provided to analysis server 19 in block 101 as the starting point for algorithm 100 will be referred to as the "node of interest" in the following discussion of FIGS. 3A-3E.

Analysis server 19 then proceeds to block 102 and generates a subscriber device analysis (SDev_analysis) table to hold data that will be used in algorithm 100. One example of a SDev_analysis table 40 is shown in FIG. 4. Analysis server 19 may store table 40 locally or in database 23. Using the node_ID for the node of interest, Subscr_info table 31 (FIG. 2A) and CMTS_stat table 34 (FIG. 2D), analysis server 19 identifies all subscriber devices served by the node of interest and populates the SDev_ID field in a different row of SDev_analysis table 40 with the MAC address or other identifier for each of those identified subscriber devices. Analysis server 19 also populates the Addr, Long, Lat, and Bldg fields in each row with the corresponding information for a particular subscriber device extracted from Subscr_info table 31. The first column ("i") of SDev_analysis table 40 contains counter indices 0 through n, the purpose of which is further described below. The remaining columns of SDev_analysis table 40 are populated in subsequent steps and are discussed below.

Returning to FIG. 3A, analysis server 19 proceeds to block 103 and consults database 23 to determine if there is a currently pending severe event associated with the node of interest. As described below, algorithm 100 outputs information regarding conditions in the portion of network 12 associated with the node of interest. One or more severe events will be associated with the node of interest if conditions, either as determined in a previous performance of algorithm 100 or as indicated by intervening trouble reports received from other sources, are degraded at or below a predetermined level. If there is no pending severe event for the node of interest, analysis server 19 proceeds to block 104 on the "No" branch from block 103. In block 104, analysis server 19 populates the fields in the DnSNR, UpSNR, DnRx, UpTx, and Reg columns for each subscriber device listed in table 40 with data from SDev_stat table 33 and CMTS_stat table 34. If analysis server 19 determines in block 103 that there is a pending severe event for the node of interest, flow instead proceeds from block 103 on the "Yes" branch. In block 105, analysis server 19 utilizes an XML interface to provide the SDev_ID values from table 40 to polling server 11 and to cause polling server 11 to obtain updated DnSNR, UpSNR, DnRx, UpTx, and Reg values for each of those SDev_ID values. In some networks, for example, a polling server might only poll any given subscriber device at certain intervals under normal conditions (e.g., every 8 hours). If a severe event is pending, however, current information may be desired.

Figure 5:
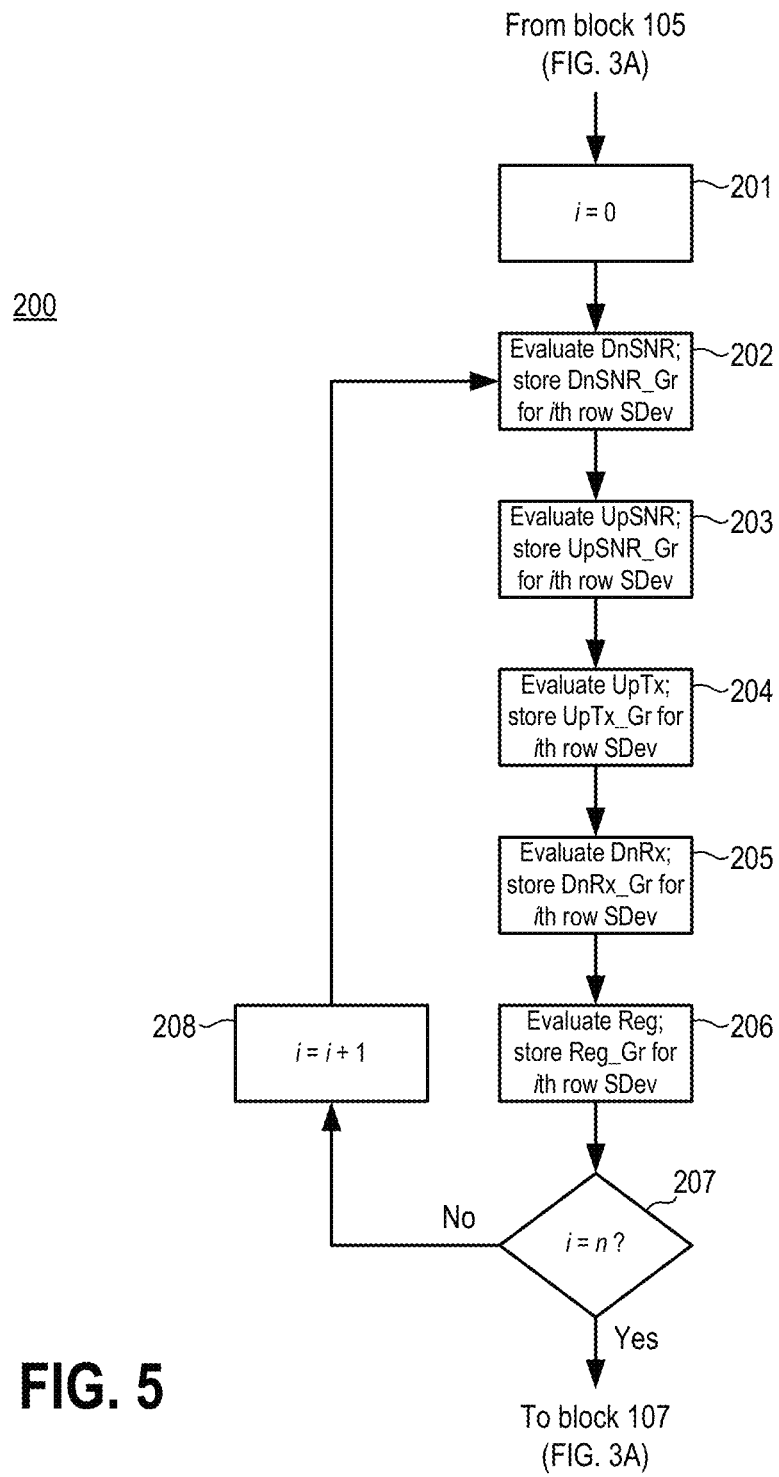
FIG. 5 is a flow chart showing a subroutine according to at least one embodiment for performing a part of the algorithm of FIGS. 3A through 3E.

From block 104 or block 105, analysis server 19 proceeds to block 106. In block 106, analysis server 19 evaluates the DnSNR, UpSNR, DnRx, UpTx, and Reg parameter values for each subscriber device listed in SDev_analysis table 40. Based on those evaluations, analysis server 19 assigns a grade for each parameter. FIG. 5 is a flow chart showing a subroutine 200 for performing these evaluations according to at least one embodiment. Turning briefly to FIG. 5, analysis server 19 initializes a loop counter i at 0 in block 201. Next, analysis server 19 retrieves the DnSNR value for the subscriber device having its MAC address (or other identifier) in the SDev_ID field of row i=0 of table 40 (block 202). If the DnSNR value for the i=0 device is within acceptable limits, a first DnSNR grade of 0 is assigned and stored in the DnSNR_Gr column field. If the DnSNR value for the i=0 device is moderately out of limits, a second grade of 0.65 is assigned and stored in the DnSNR_Gr field. If the DnSNR value for the i=0 device is severely out of limits, a third grade of 1 is assigned and stored in the DnSNR_Gr field.

Analysis server 19 then proceeds sequentially through each of blocks 203, 204, 205, and 206, performs similar operations with regard to the UpSNR, DnRx, UpTx, and Reg values for the i=0 device, and stores UpSNR_Gr, DnRx_Gr, UpTx_Gr, and Reg_Gr grades for that device. In some embodiments, the evaluation thresholds shown in Table 1 are used when evaluating parameter values in blocks 202-206.

TABLE 1

| parameter | mod. out of limits (Gr = 0.65) | sev. out of limits (Gr = 1) |
|---|---|---|
| DnSNR | <33 dB | <32 db |
| UpSNR | <27 dB | <25 dB |
| DnRx | between −8 dBmV and −9 dBmV -or- between 8 dBmV and 9 dBmV | <−9 dBmV -or- >9 bBmV |
| UpTx | >50 dBmV | >53 dBmV |
| Reg | (n/a) | not registered |

Problems can occur when (and/or be indicated by) a downstream signal received at a subscriber device has a signal strength that is too high or too low. Accordingly, and as shown in Table 1, a DnRx parameter can be considered moderately out of limits if that signal strength is between −8 dBmV and −9 dBmV or if the that signal strength is between 8 dBmV and 9 dBmV. A DnRx parameter can be considered severely out of limits if that signal strength is below −9 dBmV or if that signal strength is above 9 dBmV. As also seen in Table 1, there is only a single evaluation threshold for the Reg value. Specifically, a device is assigned a Reg_Gr of 0 if the device is registered and a Reg_Gr of 1.0 if that device is not registered.

From block 206, analysis server 19 proceeds to block 207 and determines if the parameter values for all of the subscriber devices listed in table 40 have been evaluated and graded by determining if the i counter is equal to n. If not, analysis server 19 proceeds on the "No" branch to block 208, where the i counter value is incremented. From block 208, analysis server 19 returns to block 202 to repeat the evaluation and grading operations of blocks 202-206 for the next subscriber device (i.e., the device on the row having index i=i+1). If analysis server 19 determines in block 207 that i=n, analysis server 19 proceeds on the "Yes" branch to block 107 of FIG. 3A.

Returning to FIG. 3A, analysis server 19 resets loop counter i to 0 in block 107. Analysis server 19 then proceeds to block 108 and selects the subscriber device on the $i^{th}$ row of table 40 as the "focus device." Analysis server 19 then calculates the physical distances between the focus device and each of the other subscriber devices listed in table 40 (block 109) using longitude and latitude coordinates. When i=0, for example, analysis server 19 calculates the distance from the i=0 device to the i=1 device, from the i=0 device to the i=2 device, etc. Analysis server 19 then proceeds to block 110 and identifies all subscriber devices within an initial examination radius R from the focus device. In some embodiments, R is 3.2 times the distance from the focus device to the nearest neighboring device. In some such embodiments, a minimum value is set for R (e.g., 10 meters). For example, multiple devices may be located in the same building or in buildings that are very close to one another, and the calculated distance from the focus device to its nearest neighbor may be close to zero.

Figure 6A:
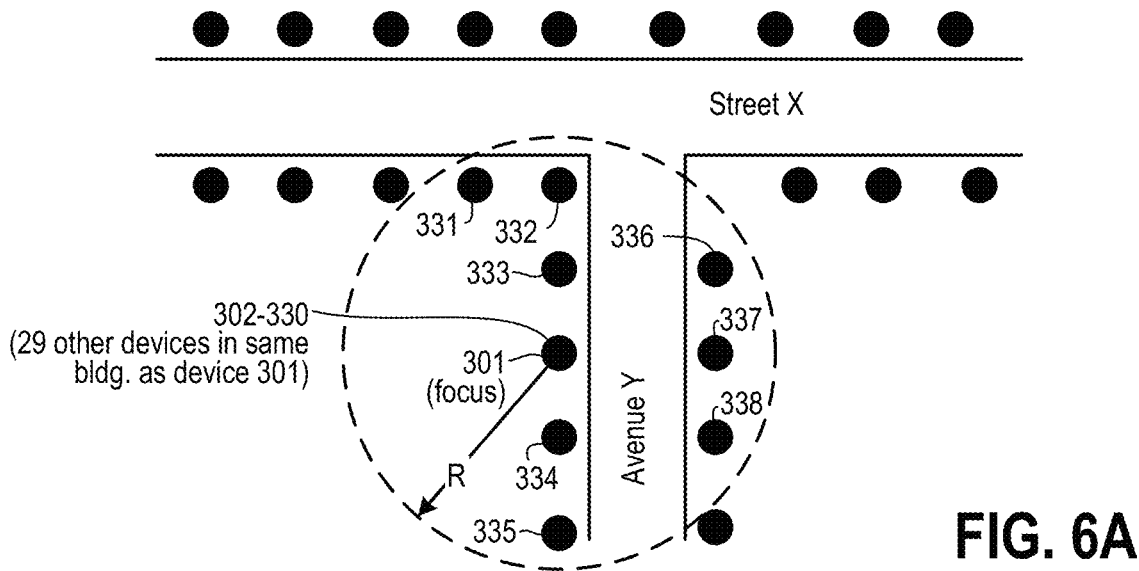
FIGS. 6A through 6D illustrate aspects of the analysis performed in the algorithm of FIGS. 3A through 3E.

FIG. 6A illustrates the identification in block 110 of all devices within a radius R of the focus device. In FIG. 6A, the focus device 301 located on Avenue Y. Other subscriber devices 302-338 are within radius R of the focus device. Devices 302-330 are in the same building as focus device 301.

From block 110 (FIG. 3A), analysis server 19 proceeds to block 120 (FIG. 3B) and separately totals the values in each of the DnSNR_Gr, UpSNR_Gr, DnRx_Gr, UpTx_Gr, and Reg_Gr columns of table 40 for the subset of devices that includes the focus device and all of the other devices identified in block 110. In the present example, server 19 totals the values for devices 301-338 from the DnSNR_Gr column, totals the values for devices 301-338 from the UpSNR_Gr column, totals the values for devices 301-338 from the DnRx_Gr column, etc. Each of those totals is then divided by the number of devices in the subset (38 in the current example) to obtain average grades DnSNR_GrAV, UpSNR_GrAV, DnRx_GrAV, UpTx_GrAV, and Reg_GrAV for the subset. Analysis server 19 then proceeds to block 121 and determines if any of the average grades DnSNR_GrAV, UpSNR_GrAV, DnRx_GrAV, UpTx_GrAV, and Reg_GrAV calculated in block 120 is equal to or greater than a problem-defining threshold. In some embodiments, the problem-defining threshold is 0.7. If none of the average grades from block 120 is at or above the problem-defining threshold, analysis server 19 proceeds directly to block 123 on the "No" branch. If any of the average grades from block 120 is at or above the problem-defining threshold, analysis server 19 proceeds to block 122 on the "Yes" branch and flags the current subset of devices as a problem zone. This is illustrated graphically in FIG. 7A by a problem zone 401 containing the grouping of devices 301-338. Analysis server 19 then proceeds to block 123.

Figure 6B:
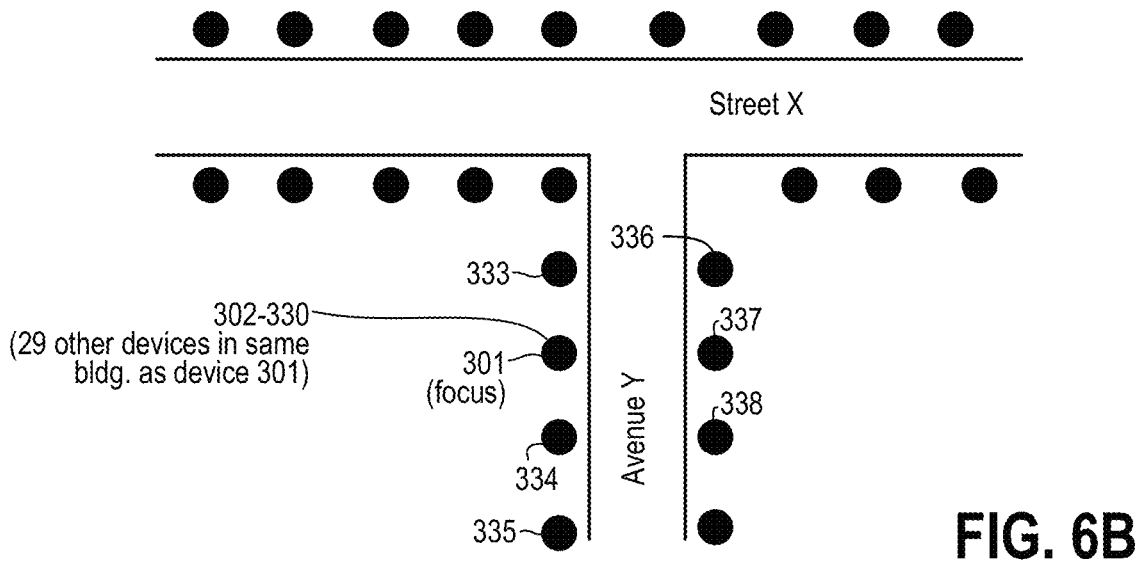

In block 123, the subset of devices identified in block 110 is reduced to only include the devices on the same street as the focus device. This is shown in FIG. 6B. In block 124, analysis server 19 then recalculates DnSNR_GrAV, UpSNR_GrAV, DnRx_GrAV, UpTx_GrAV, and Reg_GrAV based only on the devices in the reduced subset from block 123 (devices 301-330 and 333-338 in the current example). Analysis server 19 then proceeds to block 125 and determines if any of the DnSNR_GrAV, UpSNR_GrAV, DnRx_GrAV, UpTx_GrAV, or Reg_GrAV values calculated in block 124 is equal to or above the problem-defining threshold. If not, flow proceeds directly to block 127 on the "No" branch. If any of the values from block 124 is at or above the problem-defining threshold, flow proceeds to block 126 on the "Yes" branch, where analysis server 19 flags the reduced subset from block 123 as another problem zone. This is shown graphically in FIG. 7B by a problem zone 402 containing the grouping of devices 301-330 and 333-338. Flow then proceeds to block 127.

Figure 6C:
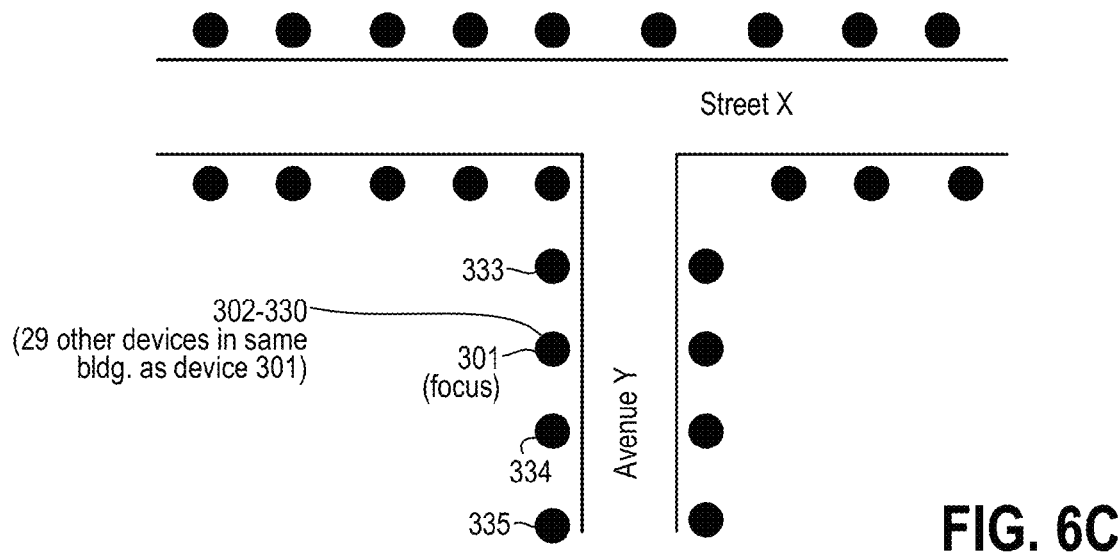

In block 127, the reduced subset from block 123 is further reduced to only include the devices on the same side of the street as the focus device. This is shown in FIG. 6C. In block 140 (FIG. 3C), analysis server 19 recalculates DnSNR_GrAV, UpSNR_GrAV, DnRx_GrAV, UpTx_GrAV, and Reg_GrAV based only on the devices in the further reduced subset of block 127 (devices 301-330 and 333-335 in the present example). Analysis server 19 then proceeds to block 141 and determines if any of the DnSNR_GrAV, UpSNR_GrAV, DnRx_GrAV, UpTx_GrAV, or Reg_GrAV values calculated in block 140 is equal to or above the problem-defining threshold. If not, flow proceeds directly to block 143 on the "No" branch. If any of the values from block 140 is at or above the problem-defining threshold, flow proceeds to block 142 on the "Yes" branch, where analysis server 19 flags the further reduced subset from block 127 as another problem zone. This is shown graphically in FIG. 7C by a problem zone 403 containing the grouping of devices 301-330 and 333-335. Flow then proceeds to block 143.

Figure 3D:
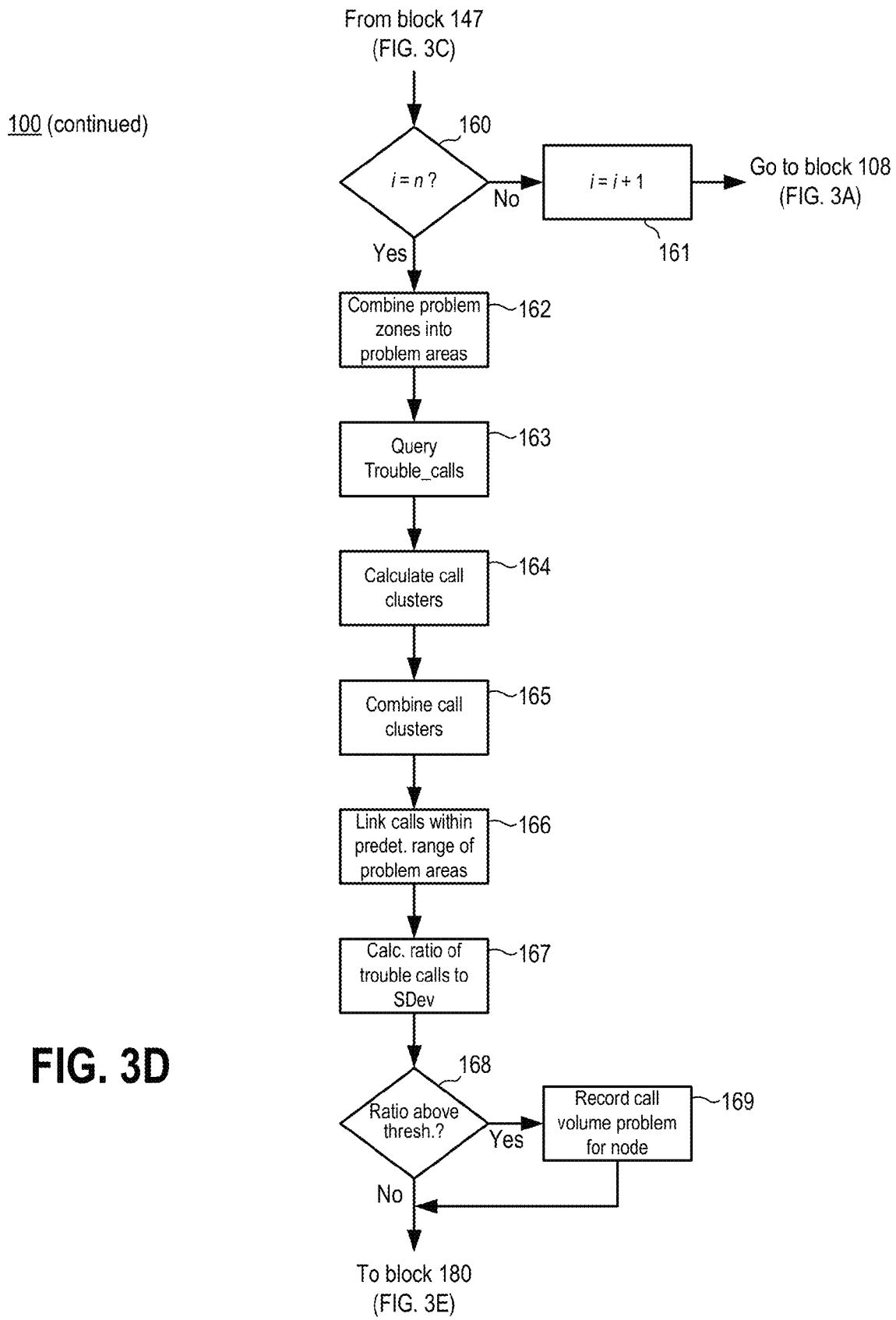
Figure 6D:
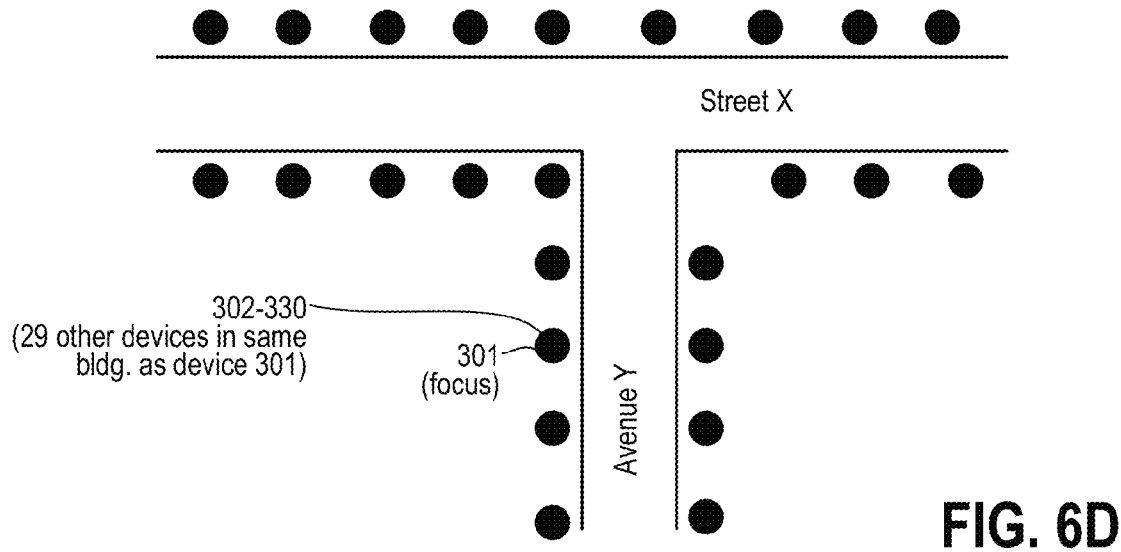

In block 143, analysis server 19 determines if the focus device is in an apartment building or other structure that contains other subscriber devices. If not, analysis server 19 proceeds to block 160 (FIG. 3D) on the "No" branch. If the focus device is in a structure containing other devices, flow proceeds to block 144 on the "Yes" branch. In block 144, the further reduced subset from block 127 is again reduced to only include the devices in the same building as the focus device. This is shown in FIG. 6D. Analysis server 19 then proceeds to block 145 and recalculates DnSNR_GrAV, UpSNR_GrAV, DnRx_GrAV, UpTx_GrAV, or Reg_GrAV for the again reduced subset from block 144 (devices 301-330 in the current example). Analysis server 19 then proceeds to block 146 and determines if any of the values calculated in block 145 is equal to or above the problem-defining threshold. If not, flow proceeds to block 160 (FIG. 3D) on the "No" branch. If any of the values from block 145 is at or above the problem-defining threshold, flow proceeds to block 147 on the "Yes" branch, where analysis server 19 flags the again reduced subset from block 144 as another problem zone. This is shown graphically in FIG. 7D by problem zone 404 containing the grouping of devices 301-330. Flow then proceeds to block 160 (FIG. 3D).

In block 160, analysis server 19 determines if i=n, where "n" is the row index for the last subscriber device listed in SDev_analysis table 40 of FIG. 4. If not, analysis server 19 proceeds to block 161 on the "No" branch and increments i by 1. Analysis server 19 then returns to block 108 (FIG. 3A) and selects the next subscriber device (i.e., the device on the row of table 40 corresponding to the incremented value of i) as the "focus device." The operations of blocks 109-160 are then repeated for the new focus device. In this manner, analysis server 19 separately conducts the analyses of blocks 109 through 160 using each subscriber device listed in table 40 (and thus, each subscriber device served by the node of interest) as the focus device.

Figure 7A:
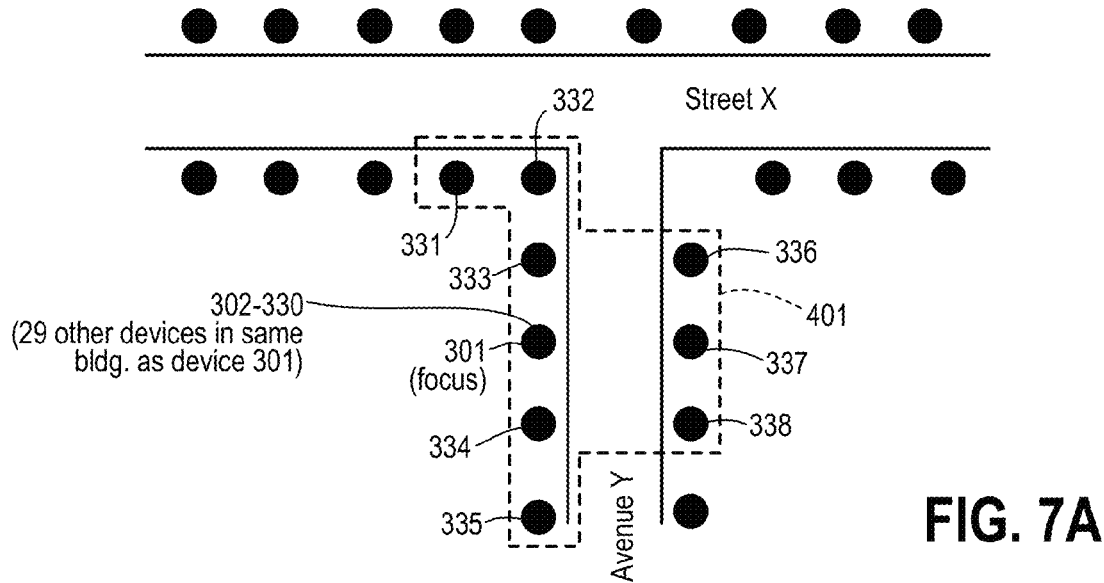
FIGS. 7A through 7H illustrate additional aspects of the analysis performed in the algorithm of FIGS. 3A through 3E.
Figure 7B:
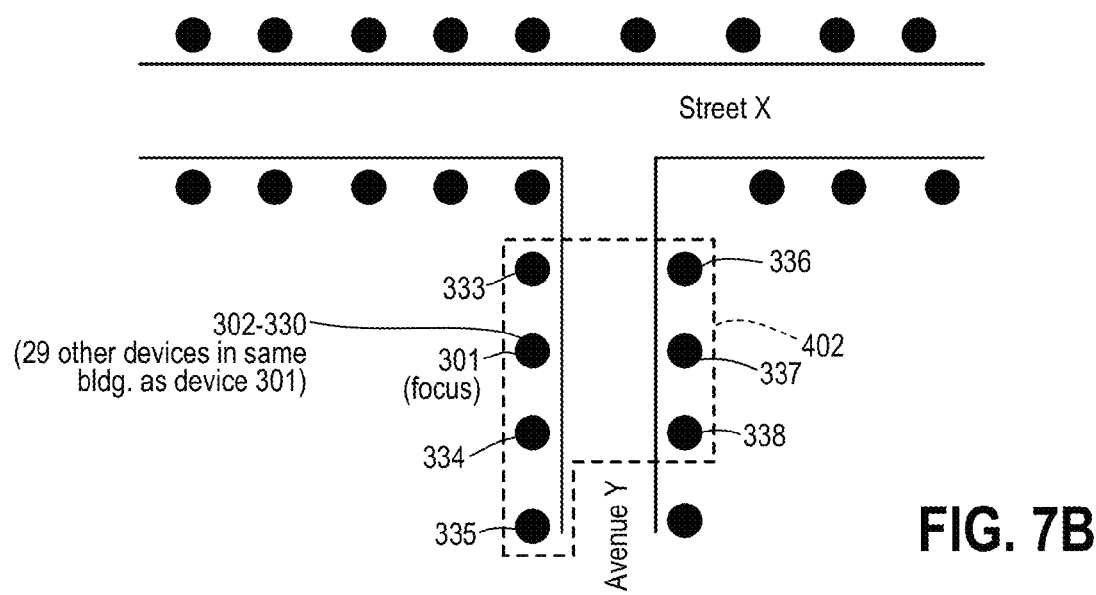
Figure 7C:
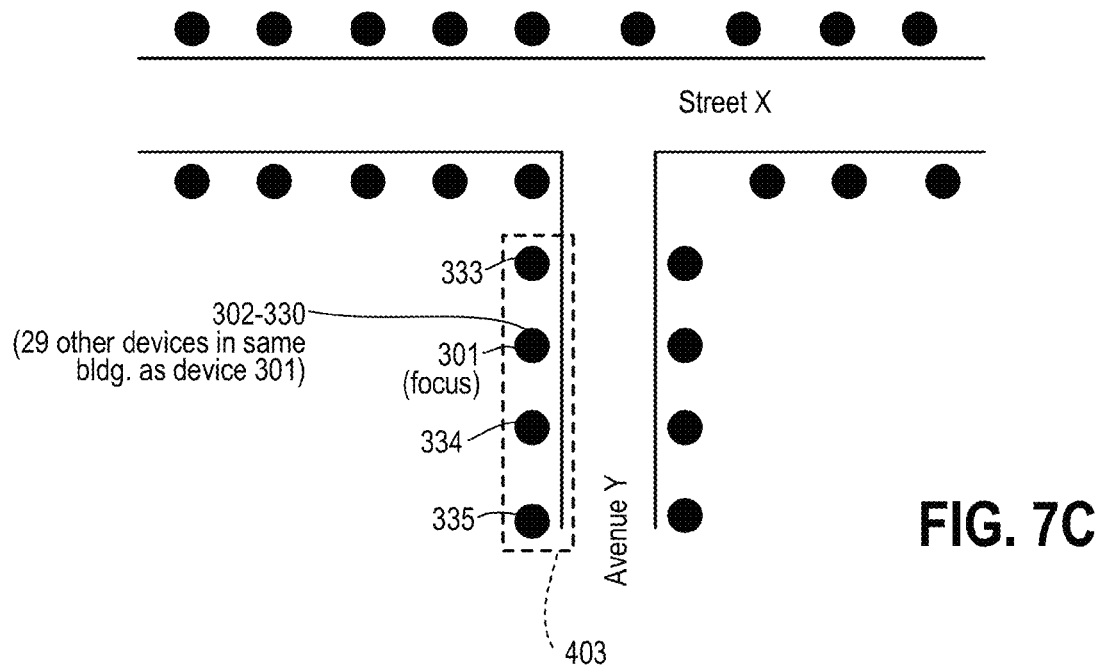
Figure 7D:
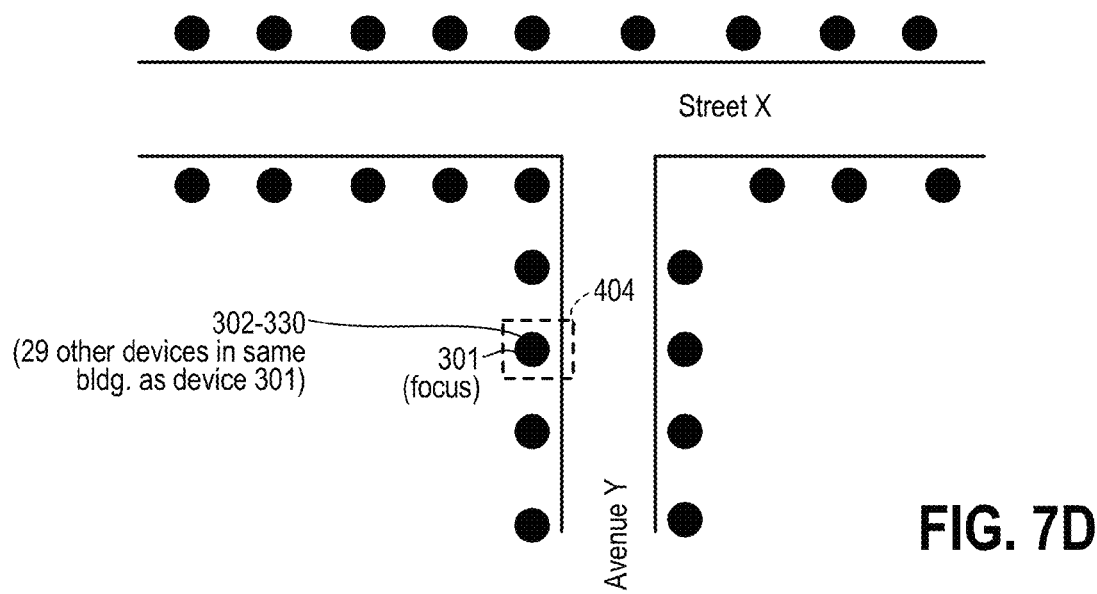
Figure 7E:
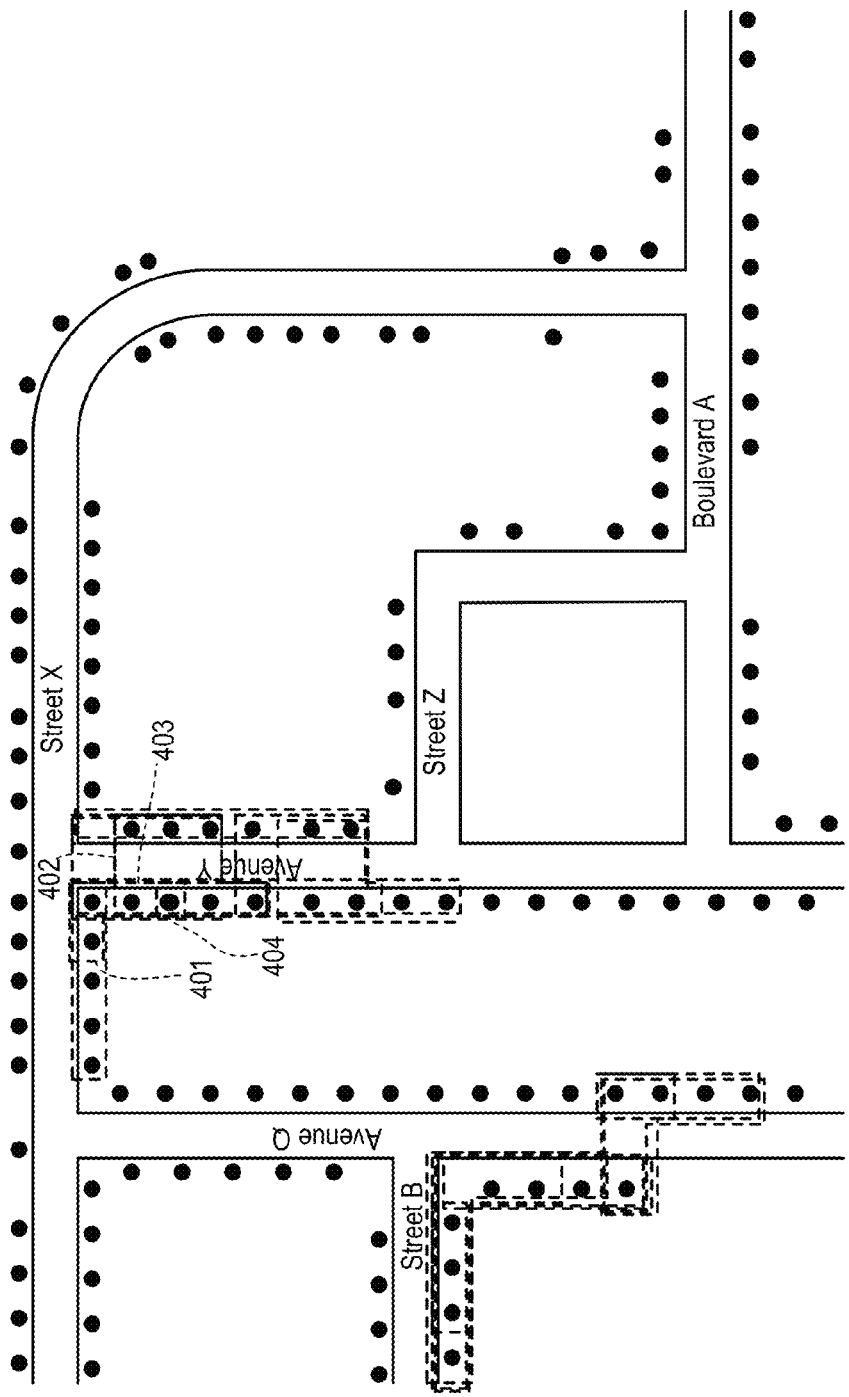
Figure 7F:
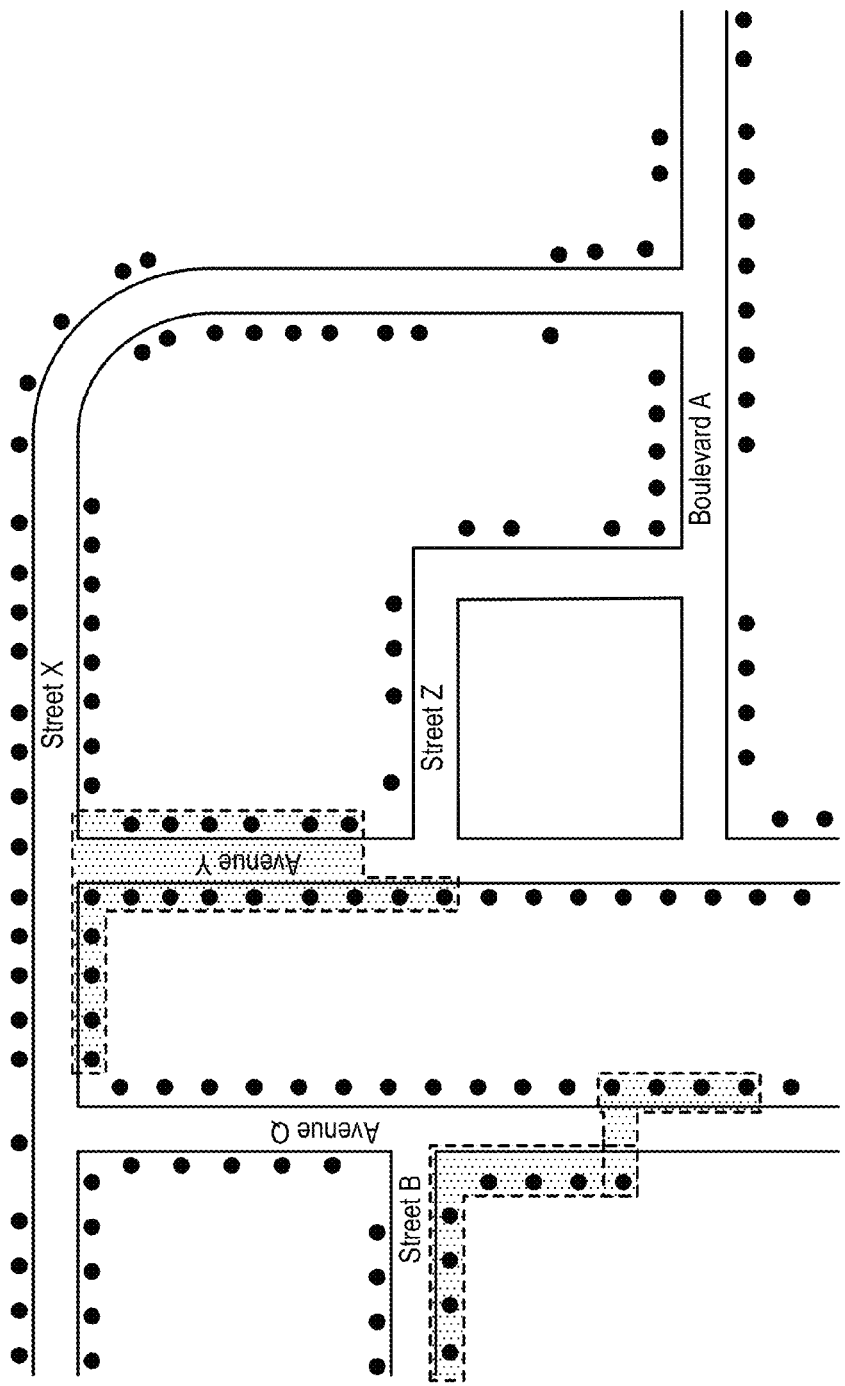

If analysis server 19 determines in block 160 that i=n, then the operations of blocks 109-160 have been separately performed by using each device listed in table 40 as the focus device, and flow proceeds on the "Yes" branch to block 162. At this stage, the patterning operations of blocks 109-160 may have identified numerous overlapping problem zones. This is illustrated graphically in FIG. 7E, where zones 401-404 and several additional zones are shown. For simplicity, only a few additional problem zones are indicated in FIG. 7E. In practice, a much larger number of overlapping problem zones could result from numerous iterations of blocks 109-160. In block 162, analysis server 19 compares each of the individual problem zones and combines each overlapping pair of zones that have 3 or more subscriber devices in common. This operation in block 162 continues until there is no remaining problem zone with more than two subscriber devices in common with another problem zone. This is illustrated in FIG. 7F. For convenience, the results of the combined problem zones will be referred to as problem areas.

Figure 7G:
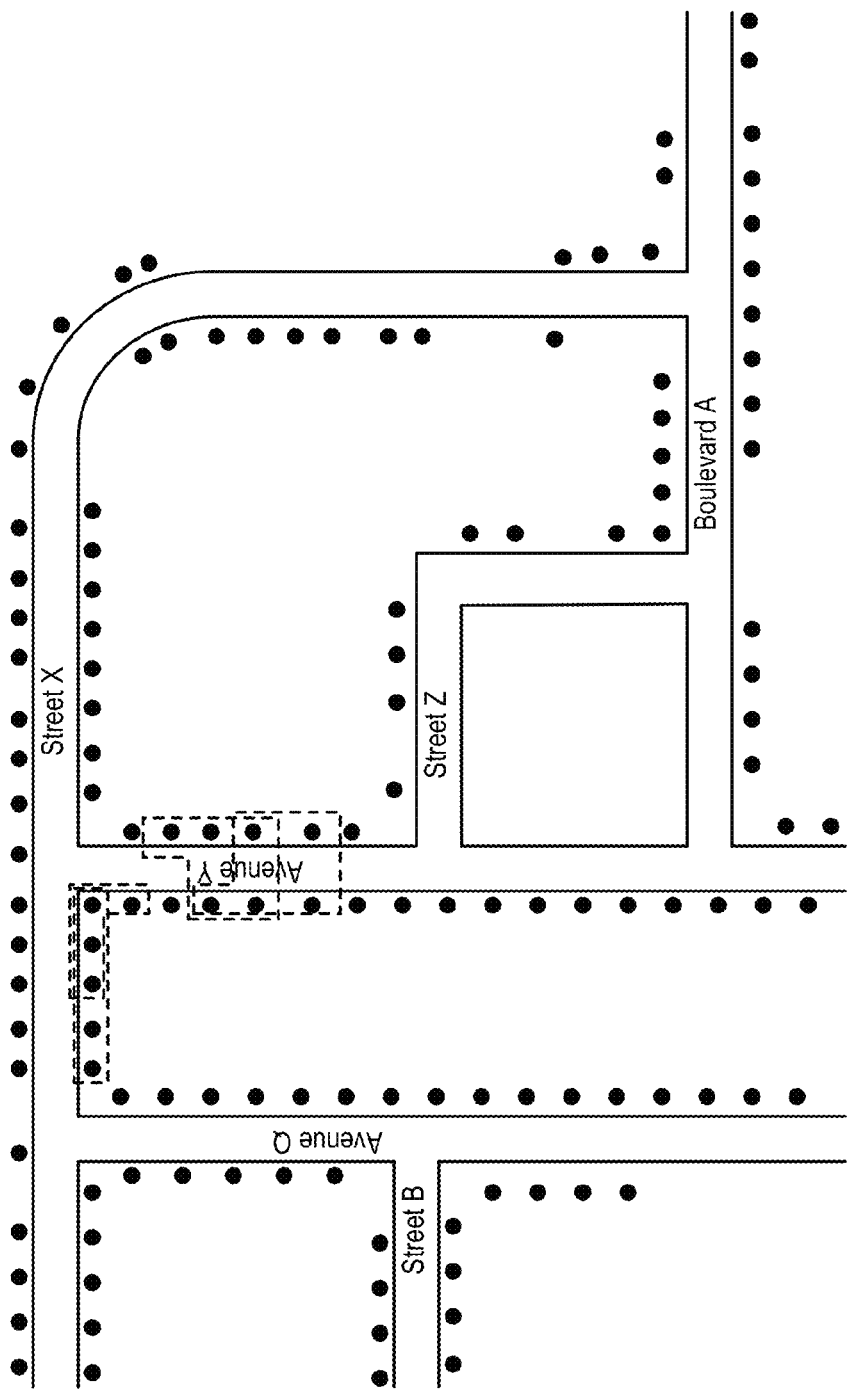
Figure 7H:
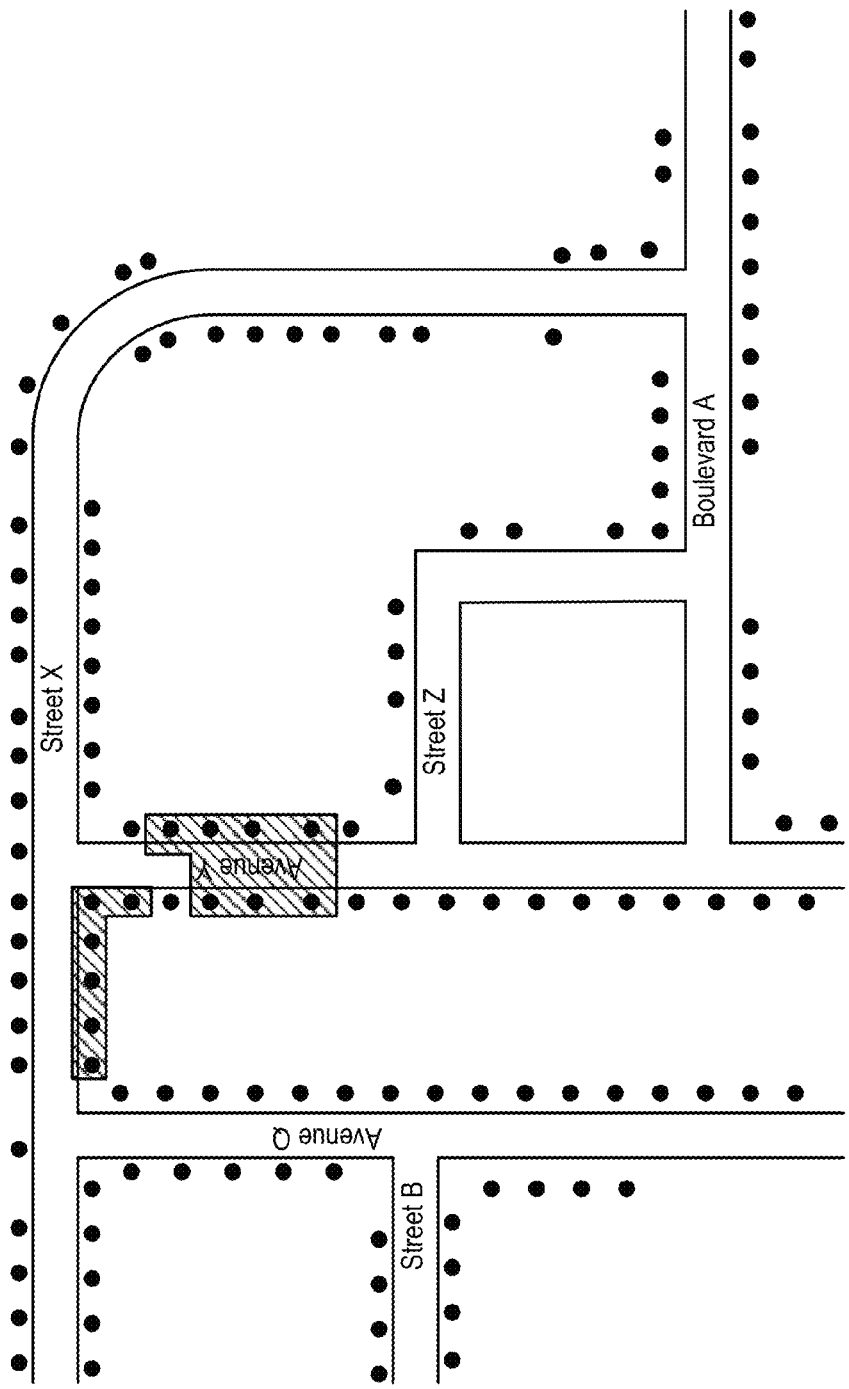

Analysis server 19 then proceeds to block 163 and queries the Trouble_calls table 32 (FIG. 2B) in database 23 for all pending trouble calls in the portion of network 12 that includes the devices in table 40. Flow then proceeds to block 164, where analysis server 19 selects one of the trouble calls returned from the query in block 163 as a focus call and calculates the distances from the location associated with the focus call to the locations associated with each of the other calls returned in block 163. If more than a predetermined number of other calls (e.g., 3 calls or more) are within a predetermined distance of the focus call (e.g., 150 meters), a call cluster is recorded. This operation is repeated in block 164 for each of the calls returned in block 163 by separately treating each call as the focus call and identifying a call cluster if there are more than the predetermined number of calls within the predetermined distance of the focus call. This may result in a group of trouble call clusters, as illustrated in FIG. 7G. Analysis server 19 then proceeds to block 165 and combines the call clusters found in block 164 by combining clusters with at least three points of commonality, as illustrated in FIG. 7H.

Figure 3E:
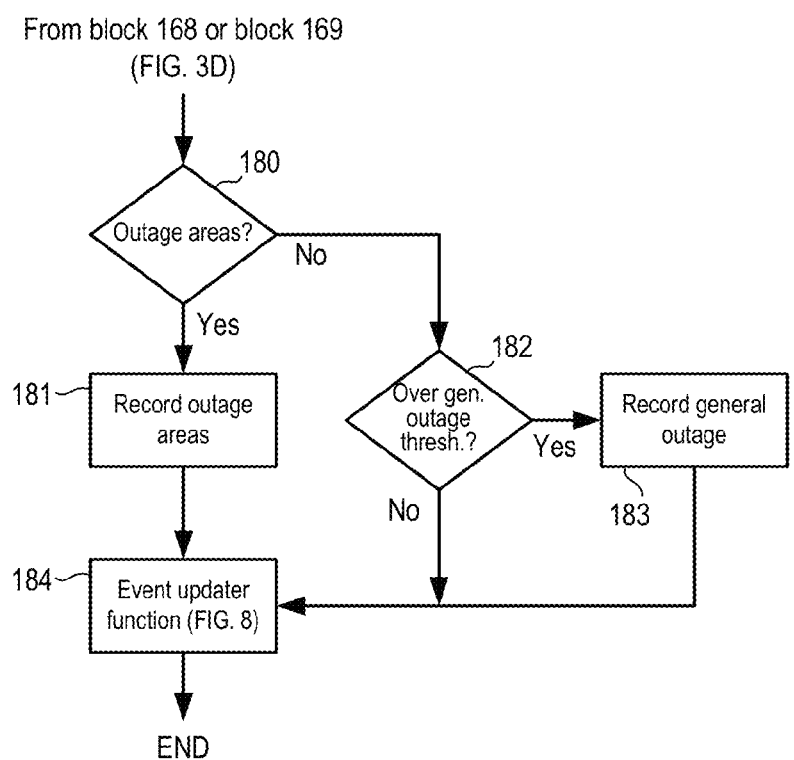

Flow then proceeds to block 166, where analysis server 19 links any of the calls returned in block 163 with problem areas from block 162 that are within a predetermined range (e.g., 30 meters). Next, analysis server 19 proceeds to block 167 and calculates the ratio of trouble calls for the node of interest to the number of subscriber devices served by that node. If the percentage is above a pre-established threshold (e.g., greater than 7%)(block 168), analysis server 19 proceeds on the "Yes" branch to block 169 and records a general call volume problem for the node. From block 169, analysis server 19 proceeds to block 180 (FIG. 3E). If the percentage was not above the pre-established threshold in block 108, analysis server 19 proceeds on the "No" branch directly to block 180.

In block 180, analysis server 19 determines if any of the problem areas from block 162 could be classified as an outage area. In some embodiments, a problem area is assigned a more urgent priority if it is also an outage area. In at least some such embodiments, analysis server 19 identifies outage areas by calculating the percentage of devices offline in each problem area (i.e., devices for which Reg=not registered) and treating the problem area as an outage area if there are at least 4 devices offline and 40% of the total devices in the problem area are offline. If any of the problem areas from block 162 were determined to be outage areas, analysis server 19 proceeds to block 181 on the "Yes" branch and records those outage areas. If no outage areas were found in block 180, analysis server 19 proceeds on the "No" branch to block 182 and determines if the number of offline devices served by the node of interest is above a general outage threshold. In at least some embodiments, general outage thresholds are as set forth in Table 2.

TABLE 2

| No. of subscriber device served by node | Minimum offline percentage |
|---|---|
| 3-8 | 50% |
| 9-19 | 40% |
| 20-29 | 30% |
| 30-39 | 20% |
| 40 or more | 15% |

If there is a general outage, that general outage is recorded (block 183), and flow then proceeds to block 184.

In block 184, which is also reachable from block 181 or on the "No" branch from block 182, analysis server 19 begins an event updater function to update an event portion of database 23 in status server 15 based on the problem areas identified in block 162, the trouble call clusters identified in block 165, and the outage area(s) identified in block 181 or in block 183.

Figure 8:
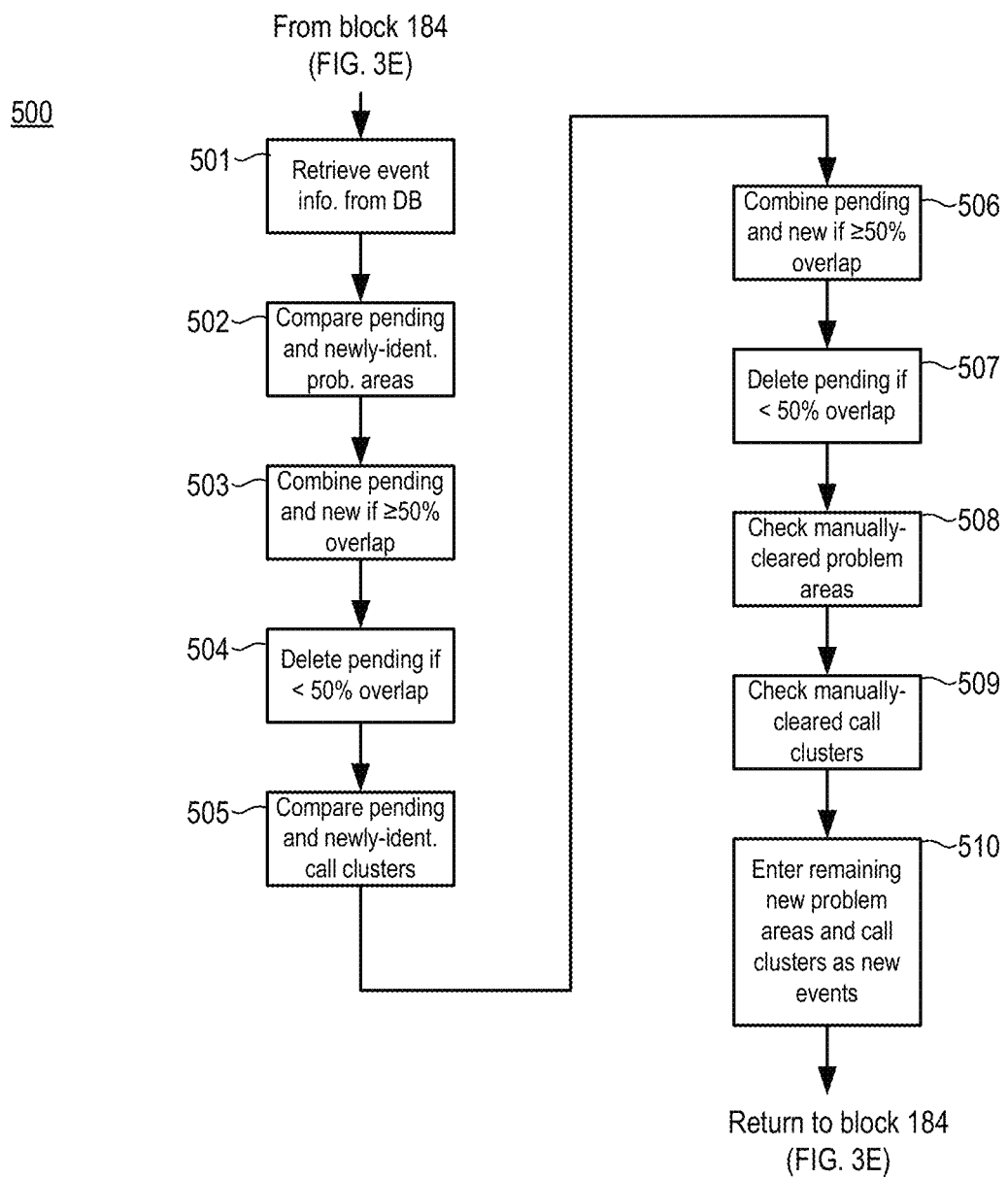
FIG. 8 is a block diagram for an event updater function according to at least some embodiments.

FIG. 8 is a block diagram for an event updater function 500 according to at least some embodiments. Beginning in block 501, analysis server 19 retrieves from database 23 information about each event that was recorded or updated during a previous analysis cycle for the node of interest (i.e., a previous performance of algorithm 100 for the node of interest). In particular, analysis server 19 retrieves information about each problem area, trouble call cluster or outage area for the node of interest that was updated or posted to database 23 by analysis server 19 at the conclusion of the last analysis cycle (i.e., the last performance of algorithm 100 for the node of interest). Any of those events may still be pending or may have been manually cleared since the completion of the previous analysis. For example, service technicians may have been dispatched as a result of events recorded or updated to database 23 during the last analysis cycle, and the technician(s) may have provided input to system 10 indicating that an event is believed to have been addressed.

Analysis server 19 proceeds to block 502 and compares each of the still-pending problem areas from the last analysis cycle with each of the problem areas newly identified in the most recent performance of block 162 (FIG. 3D). In block 502, each of the pending problem areas that shares 50% or more of its area with the area of a newly-identified problem area is updated to include the area of the newly-identified problem area. In some embodiments, physical area of a problem area is defined by unique addresses in that area represented as accounts. In some such embodiments, the percentage of area in common between two events is the percentage of accounts in common between the two events.

In block 504, each of the pending problem areas that does not share at least 50% of its area with the area of a newly-identified problem area is deleted from database 23. Partial overlap scenarios may occur in which a new event overlaps each of multiple existing events by less than 50%, but where the total overlap is greater than 50% (e.g., a new event overlaps one existing event by 25% and another existing event by 26%). In some embodiments, each of the existing events overlapped by a new event by less than 50% is nonetheless discarded and the new event recorded (in block 510, described below).

From block 504, analysis server 19 then proceeds through blocks 505 through 507 and performs similar comparisons between pending call clusters and newly-identified call clusters from the most recent operation of block 165 (FIG. 3D).

In block 508, analysis server 19 compares each problem area that was manually cleared since the previous analysis cycle with each of the problem areas newly-identified in the most recent performance of block 162. If one of those manually cleared problem shares at least 33% of its area with the area of a newly identified problem area, the manually-cleared problem area is reopened and updated to include the area of the newly-identified problem area with which it shares at least 33% of its area. Analysis server 19 then performs similar operations with regard to each call cluster that was manually cleared since the last analysis cycle (block 509). In block 510, newly-identified problem areas or call clusters that did not update a pending or previously-cleared event in one of blocks 503, 506, 508 or 509 are entered into database 23 as new events.

In block 510, analysis server 19 also records the presence or absence of each type of event in a system hierarchy table (not shown). Analysis server 19 also records the pending plant integrity number for the node of interest (e.g., a ratio of devices not in a problem area or trouble call cluster to total number of devices served by node), the pending trouble call count (which may include trouble calls that are not within a call cluster), and other information. From block 514, analysis server 19 returns to block 184 (FIG. 3E), and the current iteration of algorithm 100 ends.

Information stored in database 23 by analysis server 19 can be accessed by users through web server 20 (FIG. 1). In at least some embodiments, users access this information in a graphical user interface (GUI) displayed in a web browser application running on a laptop computer or other client of web server 20. Such laptop computers or other client devices may also contain processors, memory and communication interfaces (e.g., an Ethernet or other network card) for connection with system 10.

Figure 9:
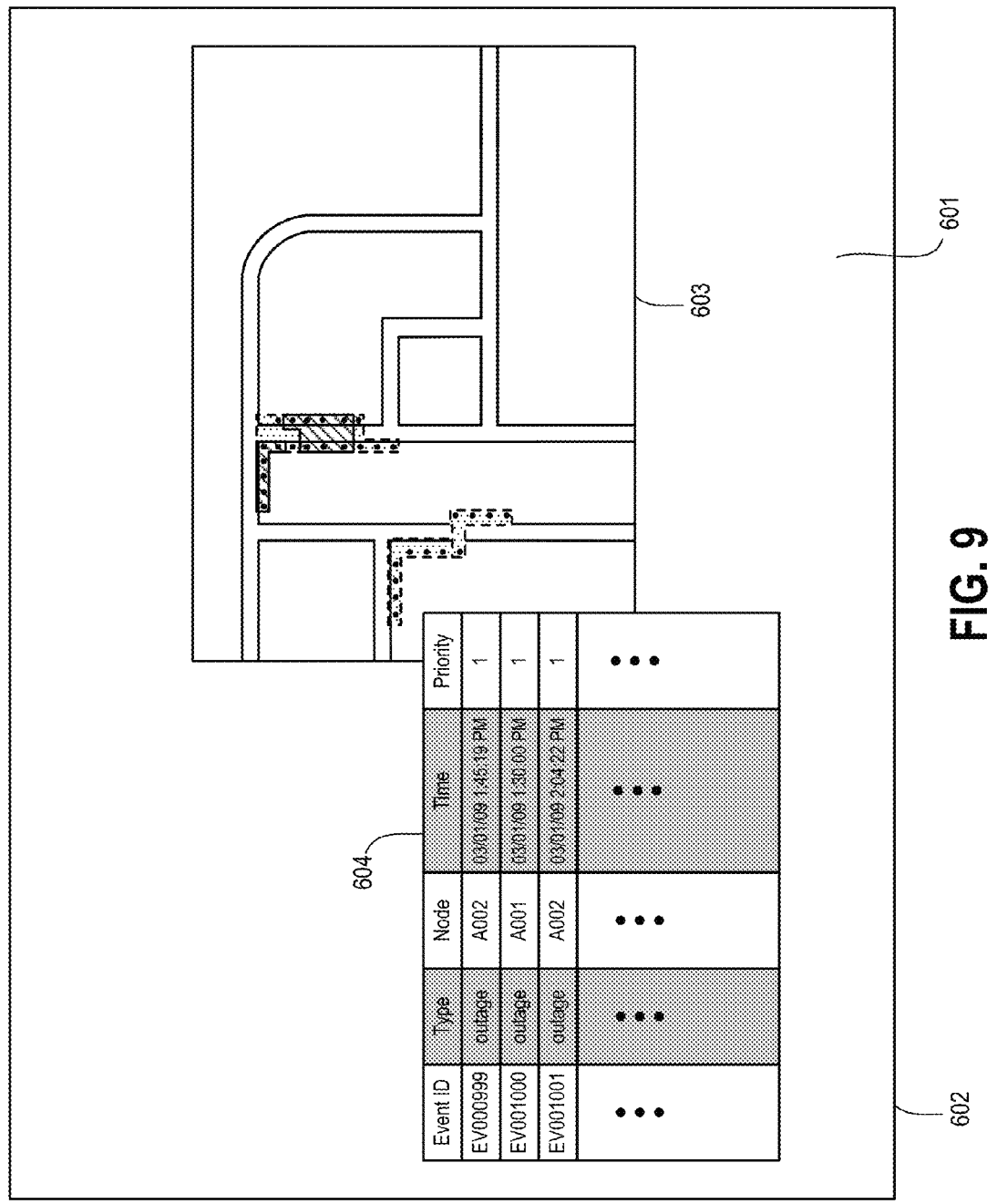
FIG. 9 shows a graphical user interface according to at least some embodiments.

FIG. 9 shows an example GUI 601 that may be presented to a user accessing database 23 according to at least some embodiments. GUI 601 includes, within a browser window 602, multiple other windows, frames and other portions that provide information to a user in various formats. Although only two such windows (603 and 604) are shown, numerous other windows could be alternately or simultaneously displayed.

Map window 603 can be used to show information about the portion of network 12 located in the geographic region covered by the map. The map in window 603 can be zoomed in to show a smaller region (and provide information about a smaller portion of network 12) or zoomed out to show a larger region (and provide information about a larger portion of network 12). In the example of FIG. 9, map 603 only shows the problem areas from the example of FIG. 7F and the consolidated trouble call clusters from the example of FIG. 7H. However, numerous other types of information could be shown on map 603. Those other information types include but are not limited to the following: other types of areas identified by analysis server 19 (e.g., outage areas); outages or other problems relating to individual subscriber devices, CMTSs, nodes and other network elements; severity of events and problems (e.g., by color coding based on priority); locations of nodes, CMTSs, generators, servers, amplifiers, subscriber devices, and other network elements; status information for individual network elements; location and/or status information for coaxial and/or fiber lines; subscriber information (e.g., type of device(s), address, name, account information); individual trouble reports; associations of trouble reports or clusters thereof with problem areas and/or individual subscriber devices or other elements; trouble call volume alerts; and service technician locations.

Table windows such as window 604 can be used to provide various information in a textual format. In FIG. 9, table window 604 includes columns for event identifiers, event type, node number, time that event was reported, and event priority. Numerous other types of information could alternatively and/or also be shown in table 604, including but not limited to the following: information regarding events that have been cleared; location and status information for network elements; subscriber information; address and/or other location information for events; pending trouble and/or maintenance calls; organization of network 12 (e.g., divisions and subdivisions, elements and subscribers in divisions and subdivisions); and information of the types described above as displayable in a map window.

Additional types of windows with other graphical and/or textual features could also be used. For example, a tree-type hierarchy chart could be used to show organization of a network by divisions and subdivisions, with CMTSs, nodes and other elements individually identified (e.g., in expandable points of the chart) under the appropriate subdivision. As but another example, bar charts or other types of graphs could be used to show performance data (real time and/or historical) for various network elements.

Figure 10:
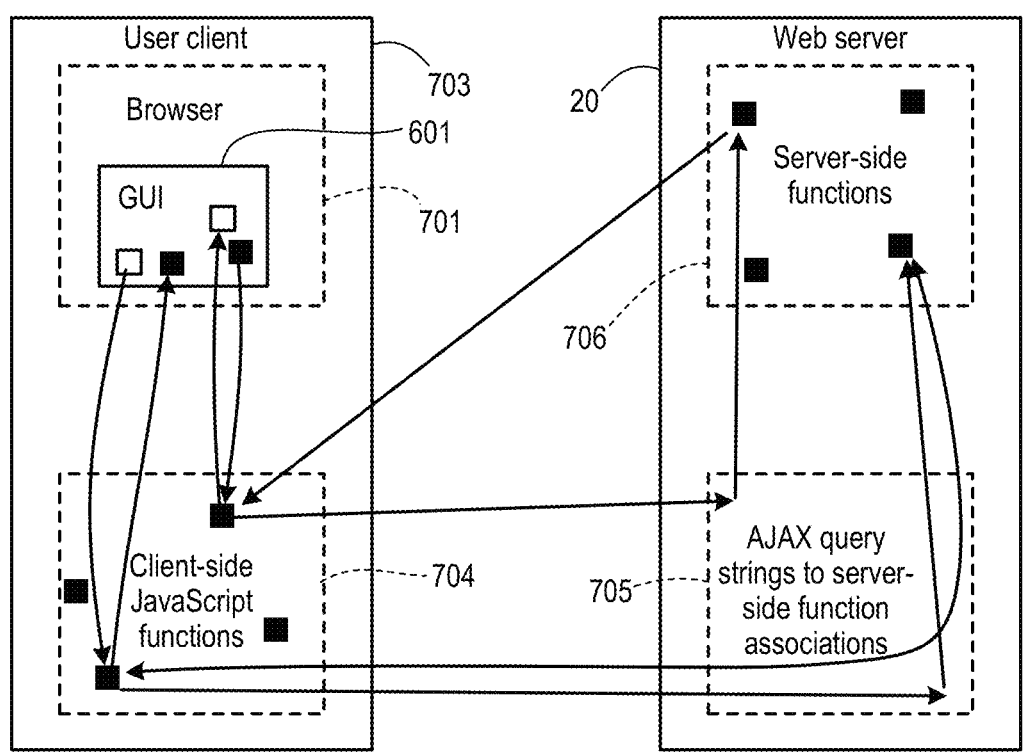
FIG. 10 is a block diagram showing generation and updating of a graphical user interface such as that of FIG. 9.

FIG. 10 is a block diagram showing generation and updating of a GUI such as that of FIG. 9 on a user client 703 according to at least some embodiments. User client 703 executes a web browser application 701. One or more client-side JavaScript functions 704 are executed by browser 701 as part of creating and updating GUI 601. Those JavaScript functions 704 interface directly and indirectly with server side functions 706 and AJAX (Asynchronous JavaScript And XML) link-backs 705 executed on web server 20. In some embodiments, almost all information in database 23 is accessible through one or more pages that a user of client 703 can view and use for data entry via web browser 701. Those pages are generated and updated by client-side functions 704 operating through an AJAX interface system. The code structure of each page reduces to three related documents: a collection of one or more core server side functions 706, one or more AJAX link backs 705, and one or more JavaScript functions 704. Page components are updated by the browser 701 calling one or more of JavaScript functions 704 that is (are) relayed to one or more server-side functions 706. The server-side function(s) return data required to update one or more areas of a page that have changed through the action performed. The called JavaScript function(s) receive the updated content and insert same into the appropriate containers in the page shown in browser 701. This allows for rapid and complex content changes to occur continuously without the overhead of redrawing an entire page.

In some embodiments, a map database of a third party provider is used as a base for some graphical representations of findings in GUI 601. In some such embodiments, the maps in GUI 601 operate solely through a JavaScript-based API. Once an instance of the third-party map is created in GUI 601, that instance is reused for all data that is displayed on that map. Creating a map instance may require a great deal of time and processing power on client 703, and changing the content of a map instance instead of instantiating a new map can greatly improve response time. Updates for a map representing one or more parts of network 12 are performed by passing raw data through an XML interface and then using one of client-side JavaScript functions 704 to decode and render that data. The data is transferred in a simple string format. For example, a static page area can be updated with a command in the form "::: <update data>" (e.g., "T:::Node R405" will change the contents of a title bar to "Node R405"). As another example, a map area can be updated with a command in the form "M:::<map object array index>::: <true/false-re-calc zoom level>::::<true/false-visible on load>::: <element definitions>". In said command, element definitions are separated by "~" and details of each element definition are separated by "|". The JavaScript decoding function passes the individual elements to a map element builder. The map element builder can receive a wide range of element definitions including icons, polygons, polylines, and easy to use circle objects, and add them to a map object.

In at least some embodiments, system 10 is designed to analyze every node in a division at least once every 60 minutes. In some such embodiments, an analysis server runs a VBScript once a minute to query a table in a database of division nodes so as to determine the maximum number of nodes that the analysis server should be analyzing simultaneously. The analysis server then clears any node analysis which has not completed within a predetermined period (e.g., 15 minutes) after its recorded start time. The analysis server then checks the system_hierarchy table to determine how many nodes are still being analyzed and calculates how many new nodes the analysis server should begin analyzing so as to maintain the maximum node analysis count. The analysis server selects that many nodes from the system_hierarchy table and records its computer name in the table as to each node so that another server will not try to analyze those nodes. The analysis server then runs a separate instance of another VBScript for each node, which VBScript records the start time of the analysis on that node and the node analysis through a service such as IIS (the INTERNET INFORMATION SERVICES family of server tools available from Microsoft Corporation) just as if a user had manually requested it.

In some embodiments, if a node analysis fails for any reason, the last poll time for that analysis is set to the current time and the analysis failure is recorded. The analysis of that node can then be retried when all other nodes in an analysis group (e.g., a network division) have been analyzed. In other embodiments, a node analysis must fail three times before the node is skipped, while in other embodiments a node is not skipped regardless of how many times an analysis fails.

In some embodiments, the analyses described above can be simultaneously performed in multiple threads on multiple analysis servers. In some such embodiments, the multithreaded analysis system never stops running and constantly cycles through a table of nodes to analyze the next node which has the oldest "last analyzed" timestamp. As indicated above, a node with which a severe event is currently associated can be analyzed using live data obtained by polling server 11 in real time. In at least some embodiments, a node is considered to be experiencing a severe event if there are three or more pending events (e.g., one or more problem areas, call clusters, and/or outage areas described above). Similarly, a poll for live data can be performed in the absence of a pending severe event if the archived data in any of tables 31-35 of status server 15 contains significant time gaps or otherwise suggests power outage or other problem occurred during a routine poll of subscriber devices and CMTSs.

Figure 11:
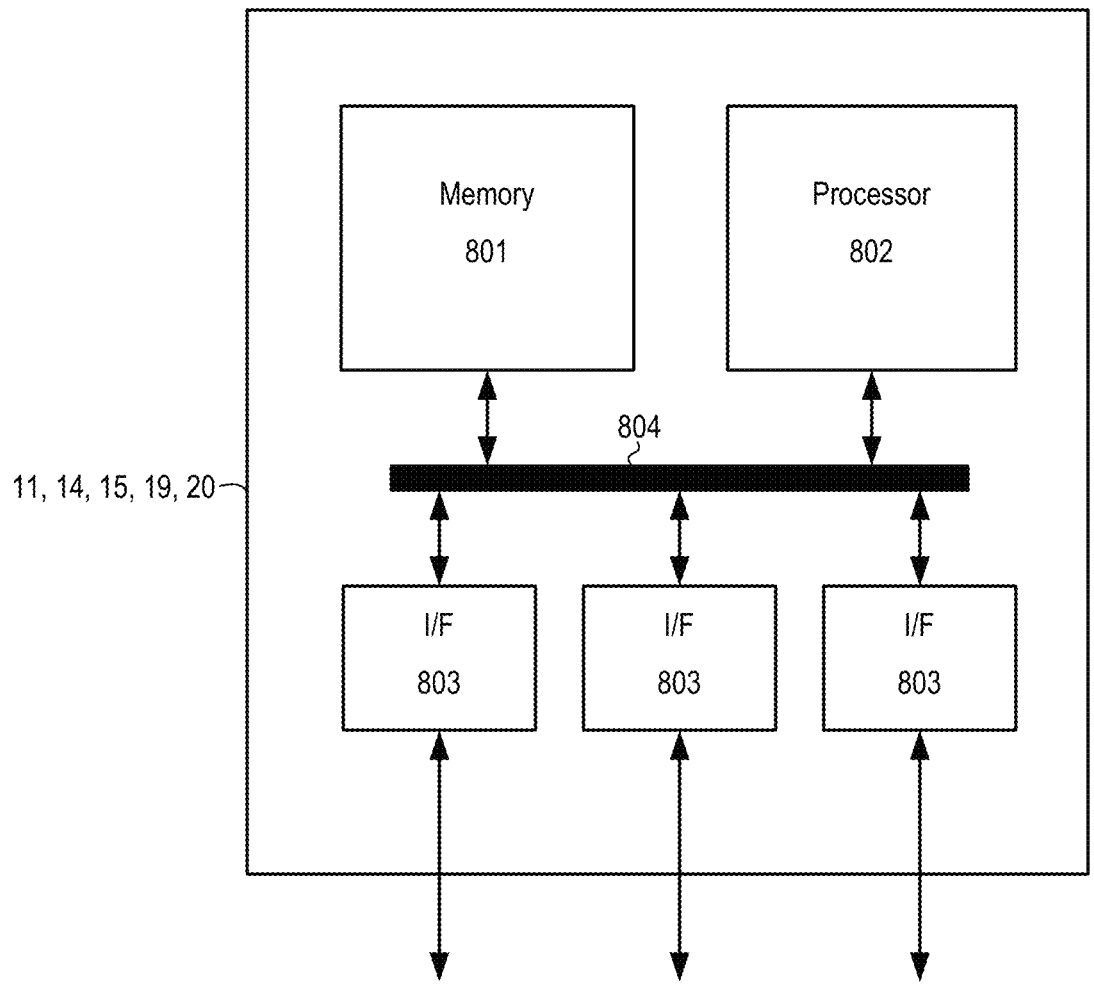
FIG. 11 is a partially schematic block diagram of a server according to at least some embodiments.

In at least some embodiments, each of web server 20, status database server 15, polling server 11, subscriber database server 14 and analysis server 19 can be implemented as multiple servers for redundancy and/or to increase the amount of analysis, data storage and other services being performed simultaneously. FIG. 11 is a partially schematic block diagram of a server that can act as one of web server 20, status server 15, polling server 11, subscriber database server 14 and analysis server 19. The server includes one or more hardware interfaces 803 that provide physical connections by which the server communicates with other servers in system 10 and/or with other elements of network 12. In at least some embodiments, hardware interfaces 803 include one or more Ethernet cards. The server further includes memory 801 for storing instructions and data and a processor 802 for executing instructions and controlling operation of the server. Although a single block is shown for memory 801 and a single block shown for processor 802, memory and computational operations of the server could respectively be distributed across multiple memory devices and multiple processors located within the server and/or across memory and processors located on multiple platforms. Memory 801 may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 802 may be implemented with any of numerous types of devices, including but not limited to one or more general purpose microprocessors, one or more application specific integrated circuits, one or more field programmable gate arrays, and combinations thereof. In at least some embodiments, processor 802 carries out operations described herein according to machine readable instructions stored in memory 801 and/or stored as hardwired logic gates within processor 802. Processor 802 communicates with and controls memory 801 and interfaces 803 over one or more buses 804.

In some embodiments, the algorithm of FIGS. 3A-3E includes additional operations that are performed to filter faulty and/or duplicate data. In large networks, for example, there may be numerous inputs into various accounting, billing and configuration databases that provide inputs into databases maintained by subscriber database server 14, polling server 11 and/or status server 15. As the size of a network and the number of possible input sources into various databases increases, there may be a greater likelihood of incorrect or duplicate data entry. Accordingly, some embodiments include the additional operations shown in the flow chart of FIG. 12 so as reduce the effect of incorrect or duplicate data.

Figure 12:
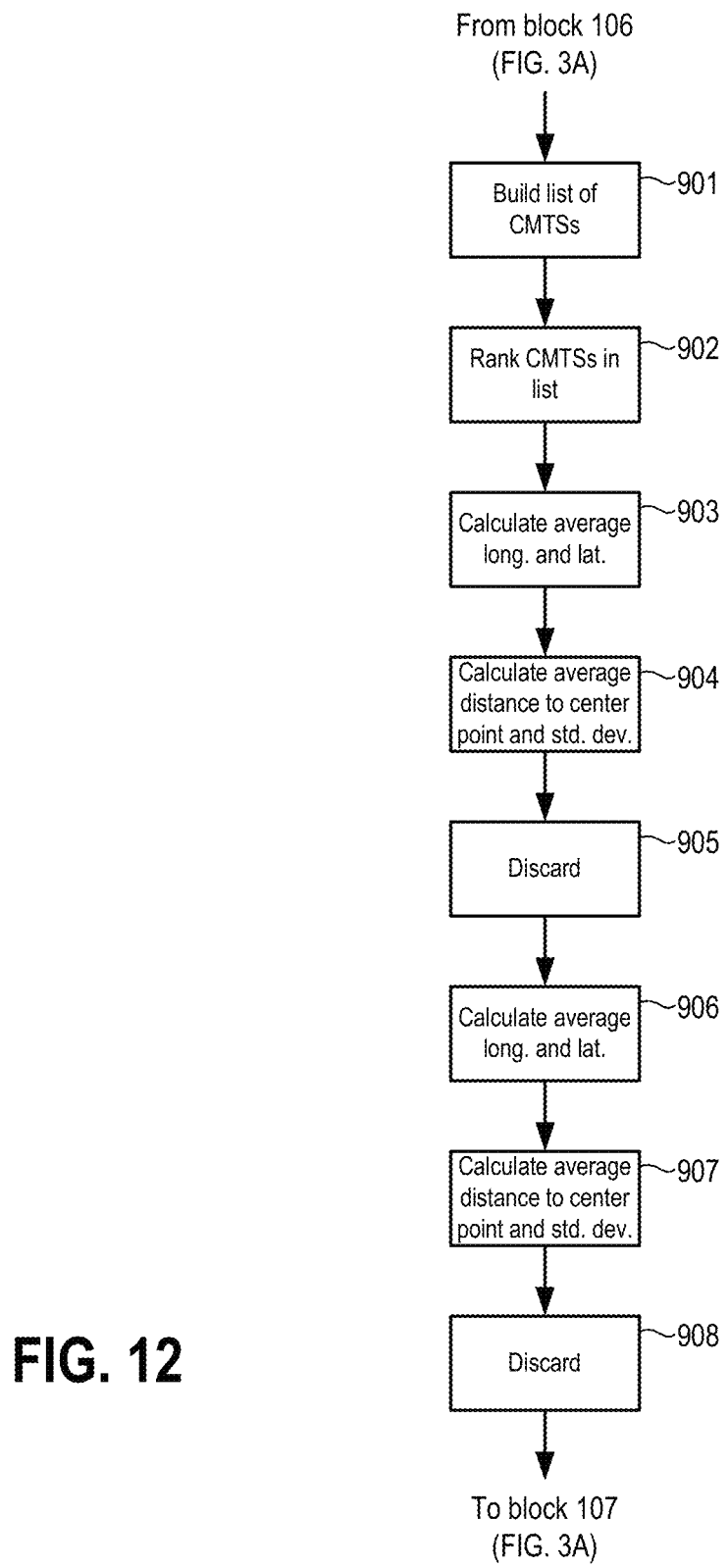
FIG. 12 is a flow chart showing additional operations included in the algorithm of FIGS. 3A through 3E according to some embodiments.

The operations in the flow chart of FIG. 12 can be inserted into the flow chart of FIGS. 3A through 3E between blocks 106 and 107 (FIG. 3A). In block 901, analysis server 19 builds a list of all CMTSs that are identified in any of tables 31-35 as serving a subscriber device served by the node of interest. Because a node should, in at least some embodiments, only be served by a single CMTS, identifying more than one CMTS for a node indicates a data error. In the embodiments described above, CMTS to node mapping is only found in CMTS_stat table 34. In other embodiments, however, the CMTS corresponding to a particular node or subscriber device could be included in other tables.

Analysis server 19 then proceeds to block 902 and ranks each of the CMTSs identified in 901 based on the number of subscriber devices associated with each CMTS. Data for any subscriber device that is not associated with the highest ranking CMTS is not further considered in the current analysis cycle. In block 903, analysis server 19 then calculates an average longitude coordinate and an average latitude coordinates from the longitude and latitudes for all of the remaining subscriber devices. In block 904, analysis server 19 calculates the distance from each of those remaining subscriber devices to a "center" point defined by the average center longitude and latitude values. Analysis server 19 also calculates the average of those distances and a standard deviation. In block 905, analysis server 19 discards (for purposes of the present analysis cycle for the node of interest) all of the subscriber devices that are located outside of a circle centered on the center point and having a radius equal to the sum of the average distance and standard deviation calculated in block 904.

Flow then proceeds to block 906, where a new center point is calculated by averaging the longitudes and by averaging the latitudes for the subscriber devices that remained after block 905. Analysis server 19 then calculates the distance from each of those subscriber devices to the new center point, averages those distances, and calculates a standard deviation (block 907). In block 908, analysis server 19 discards (for purposes of the present analysis cycle) all of the subscriber devices that are located outside of a circle centered on the new center point and having a radius equal to the sum of the average distance and standard deviation calculated in block 907. From block 908, flow proceeds to block 107 (FIG. 3A).

In some embodiments, a unique identifier is assigned to each event recorded in database 23 for a node. The unique event IDs are then combined into a string to create a unique identifier for the state of a node. If, for example, one outage, one plant fault, and one service call alert are present on a given node and assigned the IDs EV00000123, EV00000456, and EV00000789, respectively, then the current state of the node is defined as {123}{456}{789}. Every unique node state is then recorded as a separate entry in database 23. If the state of a node remains constant between two analysis cycles, a "valid through" timestamp is added or updated on the original snapshot of the node. While the actual analyzed data set may have changed in such a situation, it likely resulted from the same root problems and therefore is likely related to the original snapshot. If the state changes then a new entry is created with a new original save date. This technique can reduce the necessary storage to maintain long term easily accessible records for every node in a network. Higher level entities can be sampled and recorded every hour and then the records reduced to representative samples after 24 hours. Representative samples (e.g., saved at 12:00, 08:00 and 16:00 hours) are snapshots and may require a negligible volume of space to maintain. Every node analysis run can be recorded by converting the arrays which are used as the basis for GUI updates to strings which are stored in database 23. Storing the unformatted data can also reduce the data storage costs.

As previously indicated, the number and format of tables shown in FIGS. 2A-2E are merely one example of a manner in which data can be organized so as to facilitate the analyses described herein. Moreover, data for such tables can be imported into database 23 of status server 15 in various manners and from various sources. In some embodiments, for example, subscriber addresses, account numbers, and longitude and latitude coordinates are imported from one database. Subscriber device information (e.g., MAC address and account association) is imported from another database, and trouble calls are imported from yet other databases.

In some embodiments, polling server 11 maintains an archive of polled information for every DOCSIS device connected to network 12 (with network 12 being a national network). Three of those archives are used by status server 15: a cable modem archive, a CMTS archive, and a registration state archive. Polling server 11 updates the cable modem and CMTS archives are every 8 hours and updates the registration state archive every 10 minutes. Status server 15 updates its CM and CMTS records every 8 hours and registration state records every 30 minutes, and uses VBScripts to download, decompress, and insert all of that data into the appropriate table(s) in database 23.

Although some embodiments analyze network status based on transmitted and received signal levels at a subscriber device, received signal to noise ratios at a subscriber device and at a CMTS, and subscriber device registration status, other parameters (e.g., error rate, transmitted and received signal levels at a CMTS) and/or parameters measured from different locations could be used. Moreover, some parameters could be weighted differently than other parameters as part of the analysis. Decision thresholds and other criteria differing from those described herein could be used. For example, one above-described criterion applied to parameter values for a grouping of subscriber devices is whether an average of grades assigned to those parameter values meets or exceeds a predetermined threshold. In some embodiments, grades are not assigned to parameter values when those values are evaluated. Instead, a criterion applied is whether the average of the actual values is above or below a pre-defined level.

Embodiments of the invention include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a server or other network device to carry out operations such as are described herein. As used herein (including the claims), a machine-readable storage medium is a physical structure that can be touched by a human. A modulated signal would not by itself constitute a machine-readable storage medium.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the invention. In the claims, various portions are prefaced with letter or number references for convenience. However, use of such references does not imply a temporal relationship not otherwise required by the language of the claims.

What is claimed is:

1. A method, comprising:
receiving measured performance characteristics from a set of network devices distributed throughout a geographic region, wherein the measured performance characteristics comprise, for each network device of the set of network devices, at least one of a signal level received, a signal level transmitted, or a signal-to-noise ratio;
determining a geographic location associated with a first network device of the set of network devices;
determining a subset of the network devices that are within a geographic range of the geographic location associated with the first network device; and
classifying, by a computing device, the subset of the network devices as a problem-device grouping based on a portion of the measured performance characteristics that corresponds to the subset of the network devices.

2. The method of claim 1, wherein the classifying the subset of the network devices as a problem-device grouping comprises:
assigning each network device of the set of network devices a grade based on one or more measured performance characteristics received from the network device; and
classifying the subset of the network devices as a problem-device grouping based on a collective evaluation of assigned grades for the set of network devices.

3. The method of claim 2, further comprising collectively evaluating the assigned grades for the set of network devices to identify at least one network device of the set of network devices that is assigned a grade that indicates poor network-device performance relative to other network devices of the set of network devices.

4. The method of claim 1, wherein the determining the subset of the network devices comprises:
determining a non-zero distance between the geographic location associated with the first network device and a geographic location associated with a network device of the set of network devices that is geographically closest to the geographic location associated with the first network device; and
determining one or more other network devices of the set of network devices that are within the geographic range, wherein the geographic range is calculated based on the non-zero distance.

5. The method of claim 1, further comprising:
identifying a plurality of network trouble reports that correspond to geographic locations within a predetermined distance of one another; and
determining that the subset of the network devices is associated with at least one of the geographic locations.

6. The method of claim 1, wherein the receiving the measured performance characteristics from the set of network devices distributed throughout the geographic region comprises receiving at least one measured performance characteristic for a network device of the set of network devices that was measured by a different network device of the set of network devices.

7. A method, comprising:
determining a distance between a first geographic location associated with a first network device of a set of network devices and a second geographic location associated with a second network device of the set of network devices;
determining a subset of the network devices that are within a geographic range, calculated from the distance, of the first geographic location; and
classifying, by a computing system, the subset of the network devices as a problem-device grouping based on measured performance characteristics received from the subset of the network devices, wherein the measured performance characteristics comprise, for each network device of the subset of the network devices, at least one of a signal level received, a signal level transmitted, or a signal-to-noise ratio.

8. The method of claim 7, further comprising receiving the measured performance characteristics from the subset of the network devices.

9. The method of claim 7, wherein the second network device is a network device of the set of network devices that is geographically closest to the first geographic location.

10. The method of claim 7, further comprising:
identifying a plurality of network trouble reports that correspond to geographic locations within a predetermined distance of one another; and
determining that the subset of the network devices is associated with at least one of the geographic locations.

11. A method, comprising:
classifying, by a computing device, a set of network devices as a problem-device grouping based on their geographic proximity to one another and based on one or more measured performance characteristics received from a plurality of network devices, wherein the set of network devices comprises network devices of the plurality of network devices that are within a geographic range, determined based on a distance between a first location associated with a first network device of the plurality of network devices and a second location associated with a second network device of the plurality of network devices, of the first location, and the second network device is, of the plurality of network devices, geographically closest to the first location.

12. The method of claim 11, further comprising receiving, from each network device of the plurality of network devices, at least one of a signal level received, a signal level transmitted, or a signal-to-noise ratio.

13. The method of claim 11, further comprising:
identifying a plurality of network trouble reports that correspond to geographic locations within a predetermined distance of one another; and
determining that the set of network devices is associated with at least one of the geographic locations.

14. The method of claim 1, further comprising causing display of the problem-device grouping using a graphical user interface.

15. The method of claim 1, further comprising causing display of the problem-device grouping on a map.

16. The method of claim 1, further comprising causing display of the problem-device grouping in a tree-type hierarchy chart.

17. The method of claim 7, further comprising causing display of the problem-device grouping using a graphical user interface.

18. The method of claim 11, further comprising causing display of the problem-device grouping on a map.

* * * * *